US012761469B2

(12) United States Patent
Koretz et al.

(10) Patent No.: US 12,761,469 B2
(45) Date of Patent: Oct. 13, 2026

(54) VEHICLE CAMERA LENS CLEANING SYSTEM

(71) Applicant: Mobileye Vision Technologies Ltd., Jerusalem (IL)

(72) Inventors: Gabriel Koretz, Jerusalem (IL); Moshe Katiee, Har Gilo (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 257 days.

(21) Appl. No.: 18/552,249

(22) PCT Filed: Jun. 24, 2022

(86) PCT No.: PCT/IB2022/055902

§ 371 (c)(1),
(2) Date: Sep. 25, 2023

(87) PCT Pub. No.: WO2023/275691

PCT Pub. Date: Jan. 5, 2023

(65) Prior Publication Data

US 2024/0302649 A1 Sep. 12, 2024

Related U.S. Application Data

(60) Provisional application No. 63/216,074, filed on Jun. 29, 2021.

(51) Int. Cl.
*G02B 27/00* (2006.01)
*B60S 1/54* (2006.01)
(Continued)

(52) U.S. Cl.
CPC ............ *G02B 27/0006* (2013.01); *B60S 1/54* (2013.01); *B60S 1/56* (2013.01); *G06V 10/764* (2022.01); *G06V 20/56* (2022.01)

(58) Field of Classification Search
CPC .......... G02B 27/0006; B60S 1/54; B60S 1/56; B60S 1/46; B60S 1/548; B60S 1/566; G06V 10/764; G06V 20/56
See application file for complete search history.

(56) References Cited

U.S. PATENT DOCUMENTS

2016/0311405 A1* 10/2016 Richardson ............... B60S 1/60
2020/0249329 A1 8/2020 Herman et al.
(Continued)

FOREIGN PATENT DOCUMENTS

EP 3733462 A1 11/2020
WO 2023275691 A1 1/2023

OTHER PUBLICATIONS

Sep. 21, 2022 (PCT) International Search Report and Written Opinion—App. PCT/IB2022/055902.

*Primary Examiner* — Nga X Nguyen
(74) *Attorney, Agent, or Firm* — Banner & Witcoff, Ltd.

(57) ABSTRACT

Techniques are disclosed to implement a vehicle camera lens cleaning systems that selectively utilize different cleaning modes for the vehicle camera lenses based upon various conditions. The different cleaning modes may be used on a per vehicle camera basis to provide specific types of cleaning to each of the vehicle cameras. The cleaning modes may include the use of air and/or liquid cleaning, which may be provided to each of the vehicle cameras independently.

41 Claims, 16 Drawing Sheets

(51) Int. Cl.

| | |
|---|---|
| ***B60S 1/56*** | (2006.01) |
| ***G06V 10/764*** | (2022.01) |
| ***G06V 20/56*** | (2022.01) |

(56) References Cited

U.S. PATENT DOCUMENTS

2022/0038611 A1* 2/2022 Meister ..................... B60S 1/56
2022/0063567 A1* 3/2022 Kubota ..................... B08B 5/02
2022/0221713 A1* 7/2022 Mackey ............. G02B 27/0006

* cited by examiner

100

300

350

400

420

480

500

| Mode | Use Case | Commands | Trigger | Cleaning ECU Sequence | Parameters Provided to Cleaning ECU |
|---|---|---|---|---|---|
| RAIN | Used while driving in rain.<br><br>Note: valves open **before** compressor turns **on**.<br>Note2: Rear facing cameras may receive lower priority. | RainModeON() | External | 1. Open air valves alternately for specified duration.<br>2. Compressor speed set to LOW.<br>3. Enable compressor. | 1. **Bit mask** of cameras to be cleaned (12it) .<br>2. Air knife **duration** per camera (250ms / 12cameras ~ 20ms).<br>3. Compressor **low speed** (25%. value for ADC 1-5V).<br>4. Air valves pins.<br>5. Compressor enable pin.<br>6. Compressor speed pin. |
| | Note: valves close **after** compressor turns off. | RainModeOFF() | External | 1. Disable compressor .<br>2. Close valves. | 1. Compressor enable pin.<br>2. Air valves pins. |

FIG. 5A

500

| Mode | Use Case | Commands | Trigger | Cleaning ECU Sequence | Parameters Provided to Cleaning ECU |
|---|---|---|---|---|---|
| WASH | Used when specific camera lens is obstructed by dirt. | WashCamera() | External | 1. Open selected water valve for specified camera.<br>2. Wait for pressure release.<br>3. Enable water pump for specified duration.<br>4. Disable water pump.<br>5. Close water valve.<br>6. Open Canister valve + selected air valve for specified duration (High pressure air knife).<br>7. Close valves.<br>**<u>If Wash triggered while rain mode active</u>:**<br>1. Set compressor speed to HIGH (rain mode air valve sequence continues).<br>2. Steps 1-5 above.<br>3. Stop rain mode sequence.<br>4. Open selected air valve for specified duration (High pressure air knife).<br>5. Set compressor speed to LOW.<br>6. Resume rain mode. | 1. Water spray **duration** (200ms).<br>2. Selected water valve pin.<br>3. Selected air valve pin.<br>4. Water pump enable pin.<br>5. Canister valve pin.<br>6. Water pressure release **duration** (20ms).<br>7. High pressure air knife **duration** (1000ms).<br>8. Compressor speed pin.<br>9. Compressor **low speed** (25%).<br>10. Compressor **high speed** (100%). |
| | Used when specific camera lenses are obstructed by dirt. | WashCameras18() | External | Same as Wash, only two cameras are washed and dried simultaneously. | 1. Same as Wash.<br>2. Air+water valves #1 and #8 pins. |
| | Used when specific camera lenses are obstructed by dirt. | WashCameras45() | External | Same as Wash, only two cameras are washed and dried simultaneously. | 1. Same as Wash.<br>2. Air+water valves #4 and #5 pins. |

FIG. 5B

500

| Mode | Use Case | Commands | Trigger | Cleaning ECU Sequence | Parameters Provided to Cleaning ECU |
|---|---|---|---|---|---|
| AIR CANISTER FILL | Reserve air pressure for **WASH** sequence. | Fill canister mode | Runs always, except during RAIN mode | 1. Read pressure sensor, **if** pressure under min value:<br>2. Open canister valve.<br>3. Enable compressor on high speed until pressure reaches max value.<br>4. Disable compressor.<br>5. Close canister valve. | 1. **Min pressure** value (0.8 bar = 8%).<br>2. Pressure sense input pin.<br>3. Canister valve pin.<br>4. Compressor enable pin.<br>5. Compressor speed pin.<br>6. Compressor **high speed** value (100%).<br>7. Max pressure value (1.5 bar = 15%). |
| AIR PRESSURE RELEASE | End of day, used for releasing air pressure from canister and water pressure from tubes. | ReleaseAirPressure() | Manual | 1. Open water valve #8 for specified duration.<br>2. Close valve.<br>3. Open air valve #8 and canister valve for specified duration.<br>4. Close valves. | 1. Camera #8 water valve pin.<br>2. Camera #8 air valve pin.<br>3. Canister valve pin.<br>4. Water pressure release **duration** (2s).<br>5. Air pressure release **duration** (10s). |
| WATER TUBES FILL | After system install on vehicle, water tubes need to be filled. | FillWaterTubes() | Manual | 1. Wash camera #1 for 300ms<br>2. Wash cameras #2 #3 for 2000ms<br>3. Wash cameras #4 #5 for 2000ms<br>4. Wash cameras #6 #7 for 2000ms<br>5. Wash cameras #8 #9 for 2000ms<br>6. Wash camera #10 for 300ms<br>7. Wash cameras #11 #12 for 300ms | 1. #1-12 water valves pins.<br>2. Pump enable pin.<br>3. Wash **durations**. |

FIG. 5C

700

| Transmit | | |
|---|---|---|
| **id** | message | action |
| **0x200** | 0x01 | clean camera #1 |
| **0x200** | 0x02 | clean camera #2 |
| **0x200** | 0x03 | clean camera #3 |
| **0x200** | 0x04 | clean camera #4 |
| **0x200** | 0x05 | clean camera #5 |
| **0x200** | 0x06 | clean camera #6 |
| **0x200** | 0x07 | clean camera #7 |
| **0x200** | 0x08 | clean camera #8 |
| **0x200** | 0x09 | clean camera #9 |
| **0x200** | 0x20 | rain mode ON |
| **0x200** | 0x21 | rain mode OFF |

| Receive (for debugging) | |
|---|---|
| **id** | message |
| **0x201** | 0x01 |
| **0x201** | 0x02 |
| **0x201** | 0x03 |
| **0x201** | 0x04 |
| **0x201** | 0x05 |
| **0x201** | 0x06 |
| **0x201** | 0x07 |
| **0x201** | 0x08 |
| **0x201** | 0x09 |
| **0x201** | 0x20 |
| **0x201** | 0x21 |

FIG. 7

VEHICLE CAMERA LENS CLEANING SYSTEM

CROSS-REFERENCE TO RELATED APPLICATIONS

This application claims the benefit of and priority to U.S. provisional application No. 63/216,074, filed Jun. 29, 2021, the contents of which are incorporated herein by reference in their entirety.

TECHNICAL FIELD

Aspects described herein generally relate to techniques for performing lens cleaning of vehicle cameras.

BACKGROUND

In current vehicle camera lens cleaning systems, the air for cleaning the lenses is provided via an air tank and a compressor that provides compressed air to the pressurized air tank. High air pressure is then discharged from the air tank to clean the vehicle's camera lenses. However, because vehicle camera lenses require frequent cleaning under certain driving conditions, current vehicle camera lens systems utilize a great deal of vehicle system power and/or are not suitable for cleaning efficiently in some circumstances.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

FIGS. 5A-5C illustrate details identified with the various modes of operation used for cleaning vehicle cameras, in accordance with one or more aspects of the present disclosure;

FIG. 7 illustrates an example communication protocol for a vehicle camera lens cleaning system, in accordance with one or more aspects of the present disclosure.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Vehicle Component Architecture and Operation

Figure 1:
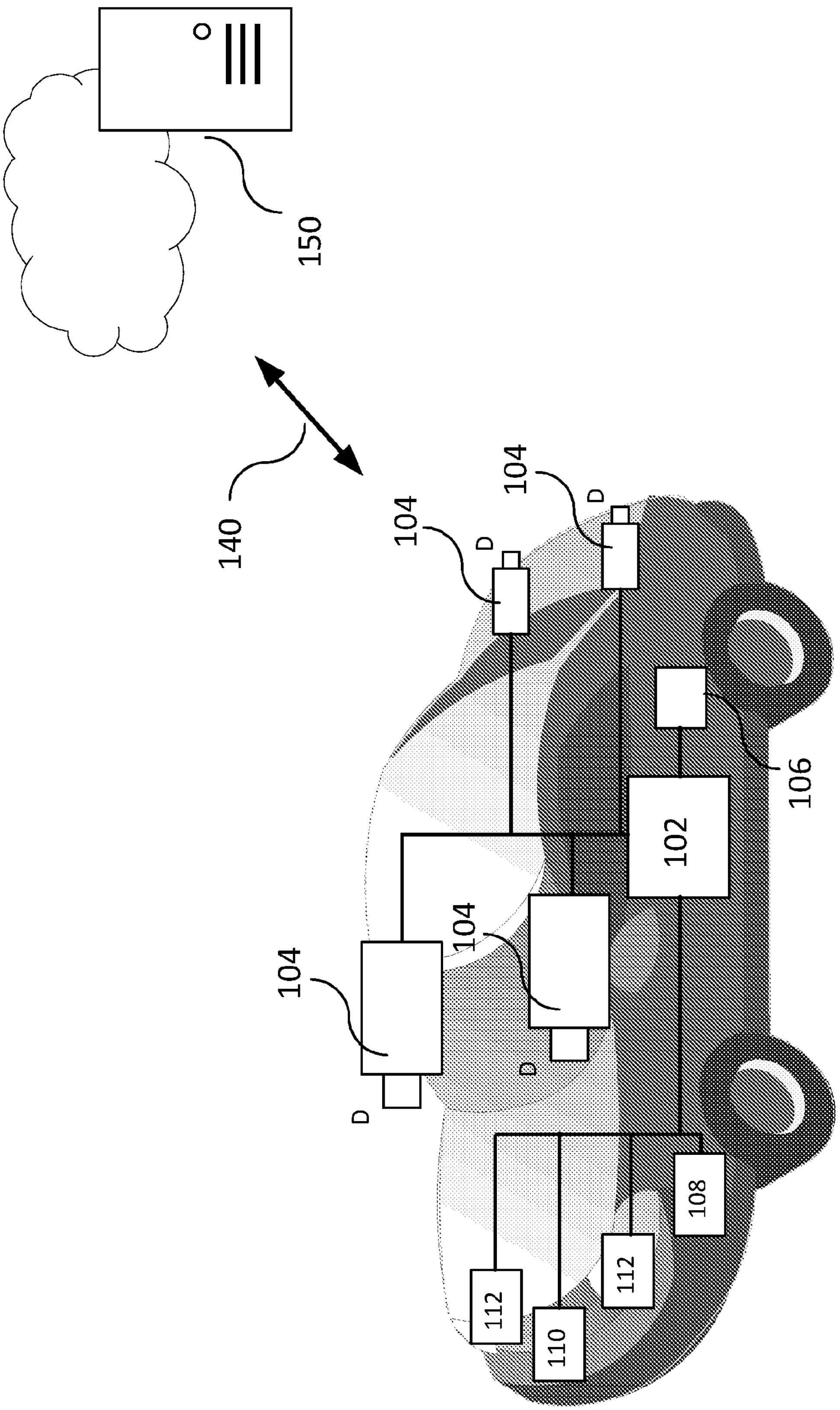
FIG. 1 illustrates an example vehicle in accordance with one or more aspects of the present disclosure.

FIG. 1 illustrates a vehicle 100 including a safety system 200 (see also FIG. 2) in accordance with various aspects of the present disclosure. The vehicle 100 and the safety system 200 are exemplary in nature, and may thus be simplified for explanatory purposes. Locations of elements and relational distances (as discussed herein, the Figures are not to scale) are provided by way of example and not limitation. The safety system 200 may include various components depending on the requirements of a particular implementation and/or application, and may facilitate the navigation and/or control of the vehicle 100. The vehicle 100 may be an autonomous vehicle (AV), which may include any level of automation (e.g. levels 0-5), which includes no automation or full automation (level 5). The vehicle 100 may implement the safety system 200 as part of any suitable type of autonomous or driving assistance control system, including AV and/or an advanced driver-assistance system (ADAS), for instance. The safety system 200 may include one or more components that are integrated as part of the vehicle 100 during manufacture, part of an add-on or aftermarket device, or combinations of these. Thus, the various components of the safety system 200 as shown in FIG. 2 may be integrated as part of the vehicle 100's systems and/or part of an aftermarket system that is installed in the vehicle 100.

The one or more processors 102 may be integrated with or separate from an electronic control unit (ECU) of the vehicle 100 or an engine control unit of the vehicle 100, which may be considered herein as a specialized type of an electronic control unit. The safety system 200 may generate data to control or assist to control the ECU and/or other components of the vehicle 100 to directly or indirectly control the driving of the vehicle 100. However, the aspects described herein are not limited to implementations within autonomous or semi-autonomous vehicles, as these are provided by way of example. The aspects described herein may be implemented as part of any suitable type of vehicle that may be capable of travelling with or without any suitable level of human assistance in a particular driving environment. Therefore, one or more of the various vehicle components such as those discussed herein with reference to FIG. 2 for instance, may be implemented as part of a standard vehicle (i.e. a vehicle not using autonomous driving functions), a fully autonomous vehicle, and/or a semi-autonomous vehicle, in various aspects. In aspects implemented as part of a standard vehicle, it is understood that the safety system 200 may perform alternate functions, and thus in accordance with such aspects the safety system 200 may alternatively represent any suitable type of system that may be implemented by a standard vehicle without necessarily utilizing autonomous or semi-autonomous control related functions.

Figure 2:
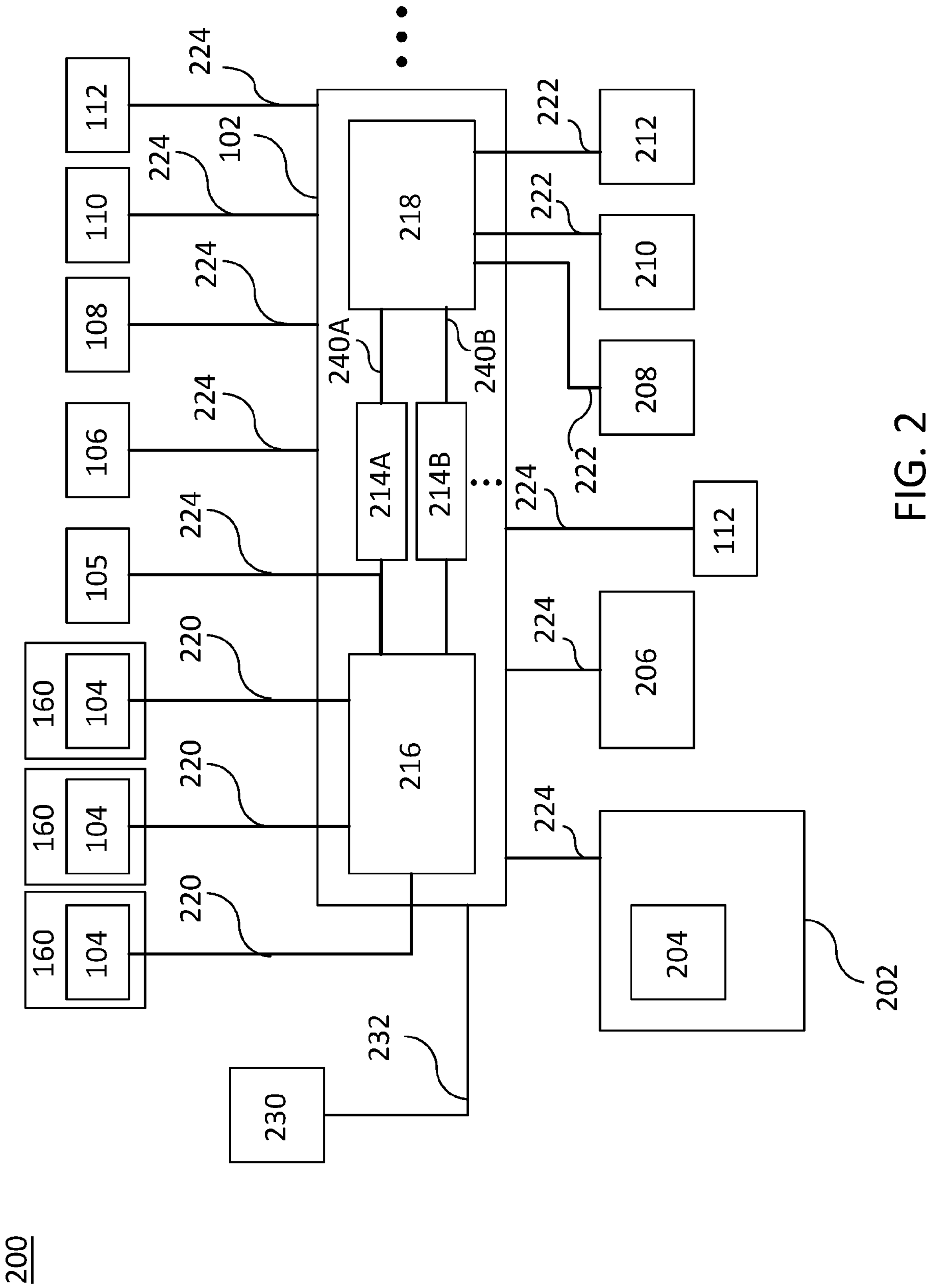
FIG. 2 illustrates various example electronic components of a safety system of a vehicle, in accordance with one or more aspects of the present disclosure.

Regardless of the particular implementation of the vehicle 100 and the accompanying safety system 200 as shown in FIG. 1 and FIG. 2, the safety system 200 may include one or more processors 102, one or more image acquisition devices 104 such as, e.g., one or more vehicle cameras or any other suitable sensor configured to perform image acquisition over any suitable range of wavelengths, one or more position sensors 106, which may be implemented as a position and/or location-identifying system such as a Global Navigation Satellite System (GNSS), e.g., a Global Positioning System (GPS), one or more memories 202, one or more map databases 204, one or more user interfaces 206 (such as, e.g., a display, a touch screen, a microphone, a loudspeaker, one or more buttons and/or switches, and the like), and one or more wireless transceivers 208, 210, 212.

The wireless transceivers 208, 210, 212 may be configured to operate in accordance with any suitable number and/or type of desired radio communication protocols or standards. By way of example, a wireless transceiver (e.g., a first wireless transceiver 208) may be configured in accordance with a Short-Range mobile radio communication standard such as e.g. Bluetooth, Zigbee, and the like. As another example, a wireless transceiver (e.g., a second wireless transceiver 210) may be configured in accordance with a Medium or Wide Range mobile radio communication standard such as e.g. a 3G (e.g. Universal Mobile Telecommunications System—UMTS), a 4G (e.g. Long Term Evolution—LTE), or a 5G mobile radio communication standard in accordance with corresponding 3GPP (3rd Generation Partnership Project) standards, the most recent version at the time of this writing being the 3GPP Release 16 (2020).

As a further example, a wireless transceiver (e.g., a third wireless transceiver 212) may be configured in accordance with a Wireless Local Area Network communication protocol or standard such as e.g. in accordance with IEEE 802.11 Working Group Standards, the most recent version at the time of this writing being IEEE Std 802.11™-2020, published Feb. 26, 2021 (e.g. 802.11, 802.11a, 802.11b, 802.11g. 802.11n, 802.11p, 802.11-12, 802.11ac, 802.11ad, 802.11ah, 802.11ax, 802.11ay, and the like). The one or more wireless transceivers 208, 210, 212 may be configured to transmit signals via an antenna system (not shown) using an air interface. As additional examples, one or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable communication protocols.

One or more of the wireless transceivers 208, 210, 212 may additionally or alternatively be configured to enable communications between the vehicle 100 and one or more other remote computing devices 150 via one or more wireless links 140. This may include, for instance, communications with a remote server or other suitable computing system as shown in FIG. 1. The example shown FIG. 1 illustrates such a remote computing system 150 as a cloud computing system, although this is by way of example and not limitation, and the computing system 150 may be implemented in accordance with any suitable architecture and/or network and may constitute one or several physical computers, servers, processors, etc. that comprise such a system. As another example, the remote computing system 150 may be implemented as an edge computing system and/or network.

The one or more processors 102 may implement any suitable type of processing circuitry, other suitable circuitry, memory, etc., and utilize any suitable type of architecture. The one or more processors 102 may be configured as a controller implemented by the vehicle 100 to perform various vehicle control functions, navigational functions, etc. For example, the one or more processors 102 may be configured to function as a controller for the vehicle 100 to analyze sensor data and received communications, to calculate specific actions for the vehicle 100 to execute for navigation and/or control of the vehicle 100, and to cause the corresponding action to be executed, which may be in accordance with an AV or ADAS system, for instance. The one or more processors 102 and/or the safety system 200 may form the entirety of or portion of an advanced driver-assistance system (ADAS).

Moreover, one or more of the processors 214A, 214B, 216, and/or 218 of the one or more processors 102 may be configured to work in cooperation with one another and/or with other components of the vehicle 100 to collect information about the environment (e.g., sensor data, such as images, depth information (for a Lidar for example), etc.). In this context, one or more of the processors 214A, 214B, 216, and/or 218 of the one or more processors 102 may be referred to as "processors." The processors may thus be implemented (independently or together) to create mapping information from the harvested data, e.g., Road Segment Data (RSD) information that may be used for Road Experience Management (REM) mapping technology, the details of which are further described below. As another example, the processors can be implemented to process mapping information (e.g. roadbook information used for REM mapping technology) received from remote servers over a wireless communication link (e.g. link 140) to localize the vehicle 100 on an AV map, which can be used by the processors to control the vehicle 100.

The one or more processors 102 may include one or more application processors 214A, 214B, an image processor 216, a communication processor 218, and may additionally or alternatively include any other suitable processing device, circuitry, components, etc. not shown in the Figures for purposes of brevity. Similarly, image acquisition devices 104 may include any suitable number of image acquisition devices and components depending on the requirements of a particular application. Image acquisition devices 104 may include one or more image capture devices (e.g., cameras, charge coupling devices (CCDs), or any other type of image sensor). The safety system 200 may also include a data interface communicatively connecting the one or more processors 102 to the one or more image acquisition devices 104. For example, a first data interface may include any wired and/or wireless first link 220, or first links 220 for transmitting image data acquired by the one or more image acquisition devices 104 to the one or more processors 102, e.g., to the image processor 216.

The wireless transceivers 208, 210, 212 may be coupled to the one or more processors 102, e.g., to the communication processor 218, e.g., via a second data interface. The second data interface may include any wired and/or wireless second link 222 or second links 222 for transmitting radio transmitted data acquired by wireless transceivers 208, 210, 212 to the one or more processors 102, e.g., to the communication processor 218. Such transmissions may also include communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

The memories 202, as well as the one or more user interfaces 206, may be coupled to each of the one or more processors 102, e.g., via a third data interface. The third data interface may include any suitable wired and/or wireless third link 224 or third links 224. Furthermore, the position sensors 106 may be coupled to each of the one or more processors 102, e.g., via the third data interface.

Each processor 214A, 214B, 216, 218 of the one or more processors 102 may be implemented as any suitable number and/or type of hardware-based processing devices (e.g. processing circuitry), and may collectively, i.e. with the one or more processors 102 form one or more types of controllers as discussed herein. The architecture shown in FIG. 2 is provided for ease of explanation and as an example, and the vehicle 100 may include any suitable number of the one or more processors 102, each of which may be similarly configured to utilize data received via the various interfaces and to perform one or more specific tasks.

For example, the one or more processors 102 may form a controller that is configured to perform various control-related functions of the vehicle 100 such as the calculation and execution of a specific vehicle following speed, velocity, acceleration, braking, steering, trajectory, etc. As another example, the vehicle 100 may, in addition to or as an alternative to the one or more processors 102, implement other processors (not shown) that may form a different type of controller that is configured to perform additional or alternative types of control-related functions. Each controller may be responsible for controlling specific subsystems and/or controls associated with the vehicle 100. In accordance with such aspects, each controller may receive data from respectively coupled components as shown in FIG. 2 via respective interfaces (e.g. 220, 222, 224, 232, etc.), with the wireless transceivers 208, 210, and/or 212 providing data to the respective controller via the second links 222, which function as communication interfaces between the respective wireless transceivers 208, 210, and/or 212 and each respective controller in this example.

To provide another example, the application processors 214A, 214B may individually represent respective controllers that work in conjunction with the one or more processors 102 to perform specific control-related tasks. For instance, the application processor 214A may be implemented as a first controller, whereas the application processor 214B may be implemented as a second and different type of controller that is configured to perform other types of tasks as discussed further herein. In accordance with such aspects, the one or more processors 102 may receive data from respectively coupled components as shown in FIG. 2 via the various interfaces 220, 222, 224, 232, etc., and the communication processor 218 may provide communication data received from other vehicles (or to be transmitted to other vehicles) to each controller via the respectively coupled links 240A, 240B, which function as communication interfaces between the respective application processors 214A, 214B and the communication processors 218 in this example.

The one or more processors 102 may additionally be implemented to communicate with any other suitable components of the vehicle 100 to determine a state of the vehicle while driving or at any other suitable time. For instance, the vehicle 100 may include one or more vehicle computers, sensors, ECUs, interfaces, etc., which may collectively be referred to as vehicle components 230 as shown in FIG. 2. The one or more processors 102 are configured to communicate with the vehicle components 230 via an additional data interface 232, which may represent any suitable type of links and operate in accordance with any suitable communication protocol (e.g. CAN bus communications). Using the data received via the data interface 232, the one or more processors 102 may determine any suitable type of vehicle status information such as the current drive gear, current engine speed, acceleration capabilities of the vehicle 100, etc. As another example, various metrics used to control the speed, acceleration, braking, steering, etc. may be received via the vehicle components 230, which may include receiving any suitable type of signals that are indicative of such metrics or varying degrees of how such metrics vary over time (e.g. brake force, wheel angle, reverse gear, etc.).

The one or more processors 102 may include any suitable number of other processors 214A, 214B, 216, 218, each of which may comprise processing circuitry such as sub-processors, a microprocessor, pre-processors (such as an image pre-processor), graphics processors, a central processing unit (CPU), support circuits, digital signal processors, integrated circuits, memory, or any other types of devices suitable for running applications and for data processing (e.g. image processing, audio processing, etc.) and analysis and/or to enable vehicle control to be functionally realized. In some aspects, each processor 214A, 214B, 216, 218 may include any suitable type of single or multi-core processor, microcontroller, central processing unit, etc. These processor types may each include multiple processing units with local memory and instruction sets. Such processors may include video inputs for receiving image data from multiple image sensors, and may also include video out capabilities.

Any of the processors 214A, 214B, 216, 218 disclosed herein may be configured to perform certain functions in accordance with program instructions, which may be stored in the local memory of each respective processor 214A, 214B, 216, 218, or accessed via another memory that is part of the safety system 200 or external to the safety system 200. This memory may include the one or more memories 202. Regardless of the particular type and location of memory, the memory may store software and/or executable (i.e. computer-readable) instructions that, when executed by a relevant processor (e.g., by the one or more processors 102, one or more of the processors 214A, 214B, 216, 218, etc.), controls the operation of the safety system 200 and may perform other functions such those identified with any of the aspects described in further detail below.

A relevant memory accessed by the one or more processors 214A. 214B, 216, 218 (e.g. the one or more memories 202) may also store one or more databases and image processing software, as well as a trained system, such as a neural network, or a deep neural network, for example, that may be utilized to perform the tasks in accordance with any of the aspects as discussed herein. A relevant memory accessed by the one or more processors 214A, 214B, 216, 218 (e.g. the one or more memories 202) may be implemented as any suitable number and/or type of non-transitory computer-readable medium such as random-access memories, read only memories, flash memories, disk drives, optical storage, tape storage, removable storage, or any other suitable types of storage.

The components associated with the safety system 200 as shown in FIG. 2 are illustrated for case of explanation and by way of example and not limitation. The safety system 200 may include additional, fewer, or alternate components as shown and discussed herein with reference to FIG. 2. Moreover, one or more components of the safety system 200 may be integrated or otherwise combined into common processing circuitry components or separated from those shown in FIG. 2 to form distinct and separate components. For instance, one or more of the components of the safety system 200 may be integrated with one another on a common die or chip. As an illustrative example, the one or more processors 102 and the relevant memory accessed by the one or more processors 214A, 214B, 216, 218 (e.g. the one or more memories 202) may be integrated on a common chip, die, package, etc., and together comprise a controller or system configured to perform one or more specific tasks or functions.

In some aspects, the safety system 200 may further include components such as a speed sensor 108 (e.g. a speedometer) for measuring a speed of the vehicle 100. The safety system 200 may also include one or more sensors 105, which may include one or more accelerometers (cither single axis or multiaxis) for measuring accelerations of the vehicle 100 along one or more axes, and additionally or alternatively one or more gyro sensors. The one or more sensors 105 may further include additional sensors or different sensor types such as an ultrasonic sensor, infrared sensors, a thermal sensor, digital compasses, and the like. The safety system 200 may also include one or more radar sensors 110 and one or more LIDAR sensors 112 (which may be integrated in the head lamps of the vehicle 100). The radar sensors 110 and/or the LIDAR sensors 112 may be configured to provide pre-processed sensor data, such as radar target lists or LIDAR target lists. The third data interface (e.g., one or more links 224) may couple the one or more sensors 105, the speed sensor 108, the one or more radar sensors 110, and the one or more LIDAR sensors 112 to at least one of the one or more processors 102.

Data referred to as REM map data (or alternatively as roadbook map data), may also be stored in a relevant memory accessed by the one or more processors 214A, 214B, 216, 218 (e.g. the one or more memories 202) or in any suitable location and/or format, such as in a local or cloud-based database, accessed via communications between the vehicle and one or more external components (e.g. via the transceivers 208, 210, 212), etc. Regardless of where the REM map data is stored and/or accessed, the REM map data may include a geographic location of known landmarks that are readily identifiable in the navigated environment in which the vehicle 100 travels. The location of the landmarks may be generated from a historical accumulation from other vehicles driving on the same road that collect data regarding the appearance and/or location of landmarks (e.g. "crowd sourcing"). Thus, each landmark may be correlated to a set of predetermined geographic coordinates that has already been established. Therefore, in addition to the use of location-based sensors such as GNSS, the database of landmarks provided by the REM map data enables the vehicle 100 to identify the landmarks using the one or more image acquisition devices 104. Once identified, the vehicle 100 may implement other sensors such as LIDAR, accelerometers, speedometers, etc. or images from the image acquisitions device 104, to evaluate the position and location of the vehicle 100 with respect to the identified landmark positions.

Furthermore, the vehicle 100 may determine its own motion, which is referred to as "ego-motion." Ego-motion is generally used for computer vision algorithms and other similar algorithms to represent the motion of a vehicle camera across a plurality of frames, which provides a baseline (i.e. a spatial relationship) that can be used to compute the 3D structure of a scene from respective images. The vehicle 100 may analyze the ego-motion to determine the position and orientation of the vehicle 100 with respect to the identified known landmarks. Because the landmarks are identified with predetermined geographic coordinates, the vehicle 100 may determine its position on a map based upon a determination of its position with respect to identified landmarks using the landmark-correlated geographic coordinates. Doing so provides distinct advantages that combine the benefits of smaller scale position tracking with the reliability of GNSS positioning systems while avoiding the disadvantages of both systems. It is further noted that the analysis of ego motion in this manner is one example of an algorithm that may be implemented with monocular imaging to determine a relationship between a vehicle's location and the known location of known landmark(s), thus assisting the vehicle to localize itself. However, ego-motion is not necessary or relevant for other types of technologies, and therefore is not essential for localizing using monocular imaging. Thus, in accordance with the aspects as described herein, the vehicle 100 may leverage any suitable type of localization technology.

Thus, the REM map data is generally constructed as part of a series of steps, which may involve any suitable number of vehicles that opt into the data collection process. For instance, Road Segment Data (RSD) is collected as part of a harvesting step. As each vehicle collects data, the data is then transmitted to the cloud or to another suitable external location as data points. A suitable computing device (e.g. a cloud server) then analyzes the data points from individual drives on the same road, and aggregates and aligns these data points with one another. After alignment has been performed, the data points are used to define a precise outline of the road infrastructure. Next, relevant semantics are identified that enable vehicles to understand the immediate driving environment, i.e. features and objects are defined that are linked to the classified data points. The features and objects defined in this manner may include, for instance, traffic lights, road arrows, signs, road edges, drivable paths, lane split points, stop lines, lane markings, etc. to the driving environment so that a vehicle may readily identify these features and objects using the REM map data. This information is then compiled into a roadbook map, which constitutes a bank of driving paths, semantic road information such as features and objects, and aggregated driving behavior.

The map database may include any suitable type of database configured to store (digital) map data for the vehicle 100, e.g., for the safety system 200. The one or more processors 102 may download information to the map database 204 over a wired or wireless data connection (e.g. the link(s) 140) using a suitable communication network (e.g., over a cellular network and/or the Internet, etc.). Again, the map database 204 may store the REM map data, which includes data relating to the position, in a reference coordinate system, of various landmarks such as items, including roads, water features, geographic features, businesses, points of interest, restaurants, gas stations, etc.

The map database 204 may thus store, as part of the REM map data, not only the locations of such landmarks, but also descriptors relating to those landmarks, including, for example, names associated with any of the stored features, and may also store information relating to details of the items such as a precise position and orientation of items. In some cases, the REM map data may store a sparse data model including polynomial representations of certain road features (e.g., lane markings) or target trajectories for the vehicle 100. The REM map data may also include stored representations of various recognized landmarks that may be provided to determine or update a known position of the vehicle 100 with respect to a target trajectory. The landmark representations may include data fields such as landmark type, landmark location, etc., among other potential identifiers. The REM map data may also include non-semantic features including point clouds of certain objects or features in the environment, and feature point and descriptors.

The map database 204 may be augmented with data in addition to the REM map data, and/or the map database 204 and/or the REM map data may reside partially or entirely as part of the remote computing system 150. As discussed herein, the location of known landmarks and map database information, which may be stored in the map database 204 and/or the remote computing system 150, may form what is referred to herein as "REM map data" or "roadbook map data." Thus, the one or more processors 102 may process sensory information (such as images, radar signals, depth information from LIDAR or stereo processing of two or more images) of the environment of the vehicle 100 together with position information, such as GPS coordinates, a vehicle's ego-motion, etc., to determine a current location and/or orientation of the vehicle 100 relative to the known landmarks by using information contained in the roadbook map. The determination of the vehicle's location may thus be refined in this manner. Certain aspects of this technology may additionally or alternatively be included in a localization technology such as a mapping and routing model.

As further discussed in detail below, each of the image acquisition devices 104 may be mechanically coupled to one or more respective vehicle camera lens cleaning components 160, which may alternately be referred to herein as a "set" of vehicle camera lens cleaning components. The vehicle camera lens cleaning components 160 may thus include any suitable combination of air and/or liquid tubes, reducers, and nozzles that are mounted to or in proximity of each of the image acquisition devices 104. The vehicle camera lens cleaning components 160 may also include one or more components of a vehicle camera lens cleaning system such as air and liquid valves, air and liquid tubes, etc. used to control the operation of the air and liquid provided via the air and liquid nozzles at each of the image acquisition devices 104 (e.g. vehicle cameras).

As further discussed below, each of the vehicle camera lens cleaning components 160 associated with each image acquisition device 104 may be independently placed into different operating modes to perform different types of cleaning with respect to the lenses and/or other components of each of the image acquisition devices 104. The operating modes may be adjusted as discussed herein to use liquid in addition to the use of air as a cleaning agent, to increase the frequency, duration, and/or intensity of the cleaning with respect to the application of liquid or air, etc. The operating modes may be controlled via the one or more processors 102 and/or via a dedicated or separate cleaning ECU (which may be identified with the vehicle components 230), the details of which being further discussed below. In any event, the operating mode, i.e. the type of cleaning and accompanying cycles executed via the vehicle camera lens cleaning components 160 may be controlled as a result of various conditions such as a manual (e.g. user-activated) trigger or conditions that result in an automatic trigger. Such automatically-triggering conditions may include, for instance, the detection of specific types of weather conditions, the identification of an obstruction in the images obtained via one or more of the image acquisition devices 104, etc.

Safety Driving Model

Furthermore, the safety system 200 may implement a safety driving model or SDM (also referred to as a "driving policy model," "driving policy," or simply as a "driving model"), e.g., which may be utilized and/or executed as part of the ADAS system as discussed herein. By way of example, the safety system 200 may include (e.g. as part of the driving policy) a computer implementation of a formal model such as a safety driving model. A safety driving model may include an implementation of a mathematical model formalizing an interpretation of applicable laws, standards, policies, etc. that are applicable to self-driving (e.g., ground) vehicles. In some embodiments, the SDM may comprise a standardized driving policy such as the Responsibility Sensitivity Safety (RSS) model. However, the embodiments are not limited to this particular example, and the SDM may be implemented using any suitable driving policy model that defines various safety parameters that the AV should comply with to facilitate safe driving.

For instance, the SDM may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic, and in turn limit the scalability of system deployment; and third, the interpretation should be efficiently verifiable in the sense that it can be rigorously proven that the self-driving (autonomous) vehicle correctly implements the interpretation of the law. An implementation in a host vehicle of a safety driving model (e.g. the vehicle 100) may be or include an implementation of a mathematical model for safety assurance that enables identification and performance of proper responses to dangerous situations such that self-perpetrated accidents can be avoided.

A safety driving model may implement logic to apply driving behavior rules such as the following five rules:

Do not hit someone from behind.
Do not cut-in recklessly.
Right-of-way is given, not taken.
Be careful of areas with limited visibility.
If you can avoid an accident without causing another one, you must do it.

It is to be noted that these rules are not limiting and not exclusive, and can be amended in various aspects as desired. The rules thus represent a social driving "contract" that might be different depending upon the region, and may also develop over time. While these five rules are currently applicable in most countries, the rules may not be complete or the same in each region or country and may be amended.

As described above, the vehicle 100 may include the safety system 200 as also described with reference to FIG. 2. Thus, the safety system 200 may generate data to control or assist to control the ECU of the vehicle 100 and/or other components of the vehicle 100 to directly or indirectly navigate and/or control the driving operation of the vehicle 100, such navigation including driving the vehicle 100 or other suitable operations as further discussed herein. This navigation may optionally include adjusting one or more SDM parameters, which may occur in response to the detection of any suitable type of feedback that is obtained via image processing, sensor measurements, etc. The feedback used for this purpose may be collectively referred to herein as "environmental data measurements" and include any suitable type of data that identifies a state associated with the external environment, the vehicle occupants, the vehicle 100, and/or the cabin environment of the vehicle 100, etc.

For instance, the environmental data measurements may be used to identify a longitudinal and/or lateral distance between the vehicle 100 and other vehicles, the presence of objects in the road, the location of hazards, etc. The environmental data measurements may be obtained and/or be the result of an analysis of data acquired via any suitable components of the vehicle 100, such as the one or more image acquisition devices 104, the one or more sensors 105, the position sensors 106, the speed sensor 108, the one or more radar sensors 110, the one or more LIDAR sensors 112, etc. To provide an illustrative example, the environmental data may be used to generate an environmental model based upon any suitable combination of the environmental data measurements. Thus, the vehicle 100 may utilize the environmental model to perform various navigation-related operations within the framework of the driving policy model.

The navigation-related operation may be performed, for instance, by generating the environmental model and using the driving policy model in conjunction with the environmental model to determine an action to be carried out by the vehicle. That is, the driving policy model may be applied based upon the environmental model to determine one or more actions (e.g. navigation-related operations) to be carried out by the vehicle. The SDM can be used in conjunction (as part of or as an added layer) with the driving policy model to assure a safety of an action to be carried out by the vehicle at any given instant. For example, the ADAS may leverage or reference the SDM parameters defined by the safety driving model to determine navigation-related operations of the vehicle 100 in accordance with the environmental data measurements depending upon the particular scenario. The navigation-related operations may thus cause the vehicle 100 to execute a specific action based upon the environmental model to comply with the SDM parameters defined by the SDM model as discussed herein. For instance, navigation-related operations may include steering the vehicle 100, changing an acceleration and/or velocity of the vehicle 100, executing predetermined trajectory maneuvers, etc. In other words, the environmental model may be generated using acquired sensor data, and the applicable driving policy model may then be applied together with the environmental model to determine a navigation-related operation to be performed by the vehicle.

A Vehicle Camera Lens Cleaning System

Again, in current vehicle camera lens cleaning systems the air for cleaning the lenses is provided via an air tank and a compressor that compresses air into the air tank, and high pressure air is discharged from the air tank to clean the vehicle's camera lenses. This mechanism consumes a great deal of vehicle system power to compress air into the air tank and is not ideal for certain cleaning scenarios. The aspects described herein advantageously recognize that different conditions require different types of lens cleaning, and thus implement vehicle camera lens camera system that selectively and dynamically utilizes different cleaning modes on a per vehicle camera lens basis depending upon the conditions and/or specific type of cleaning that is required for each camera lens.

Figure 3A:
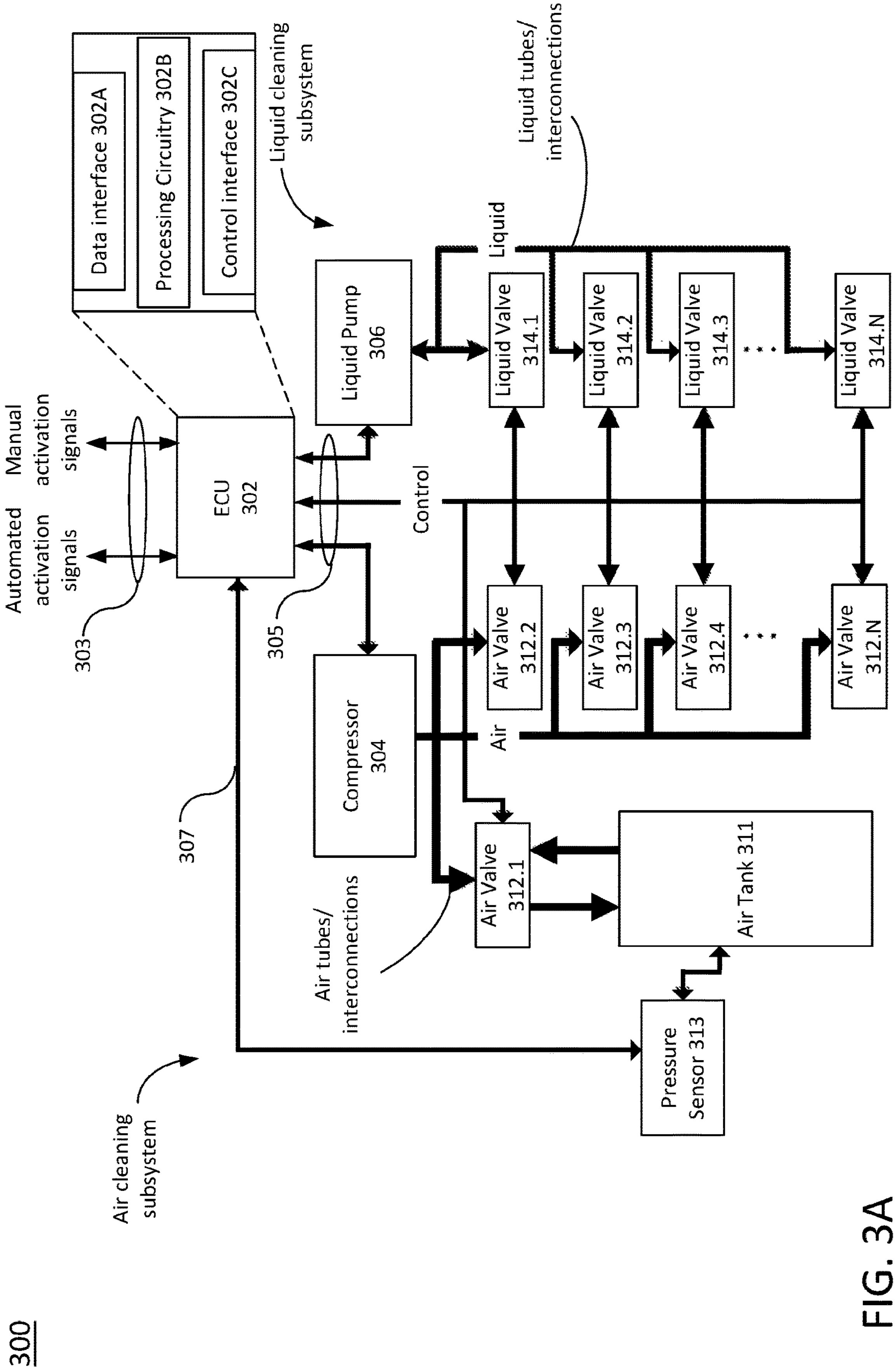
FIG. 3A illustrates an example block diagram of a vehicle camera lens cleaning system, in accordance with one or more aspects of the present disclosure.

FIG. 3A illustrates an example block diagram of a vehicle camera lens cleaning system, in accordance with one or more aspects of the present disclosure. As shown in FIG. 3A, the vehicle camera lens cleaning system 300 comprises any suitable number of vehicle camera lens cleaning components, which form two subsystems: an air cleaning subsystem and a liquid cleaning subsystem. The air cleaning subsystem comprises an air compressor 304, which is coupled to any suitable number N of actuatable air valves 312.1-312.N via an air cleaning subsystem network of any suitable number of tubes, nozzles, reducers, etc. The air compressor 304 may be configured as an on-vehicle air compressor having any suitable mounting to operate while maintaining low levels of vibrations and noise, providing sufficient air flow, and to operate using adequate measures to protect against water and other environmental factors.

The air cleaning subsystem also comprises an air tank 311 (also referred to herein as a canister or pressure tank), which is also coupled directly to the air valve 312.1, and indirectly to the remaining air valves 312.2-312.N. The air valve 312.1 may be alternatively referred to herein as a pressure tank valve or a canister valve, and is configured to control the flow of air between the air tank 311 and the air valves 312.2-312.N via the network of air tubes such that each of the air valves 312.1-312.N may be utilized by the air cleaning subsystem. For instance, the air valve 312.1 may be opened and the other air valves 312.2-312.N closed via the control signals 305 transmitted by the ECU 302 to allow re-pressurization via the compressor 304. Alternatively, when the compressor 304 is off the air valve 312.1 may be opened together with one or more of the other valves 312.2-312.N to allow for the air nozzles coupled to the air valves 312.2-312.N to deliver high pressure air supplied from the air tank 311, thus providing a high pressure air knife to one or more couple vehicle camera lenses as further discussed herein.

Although only the air valve 312.1 is shown in FIG. 3A as being coupled to both the compressor 304 and the air tank 311, this is for purposes of brevity and case of explanation, as each valve 312.1-312.N may be configured to provide, to nozzles identified with respectively coupled vehicle camera lenses, either low-pressure air provided directly from the air compressor 304 or high-pressure air provided by the pressurized air tank 311 depending upon the state of the air valves 312.1-312.N. Thus, the air valves 312.1-312.N may comprise part of any suitable type of air valve network such that each air valve 312.1-312.N may be opened or closed via control signals received via the ECU 302, as further discussed herein. The state of each air valve 312.1-312.N may thus be controlled in this manner such that the air nozzle associated with each vehicle camera lens may output air from either the compressor 304 or the air tank 311 independently from one another in accordance with a respective operating mode.

Figure 3B:
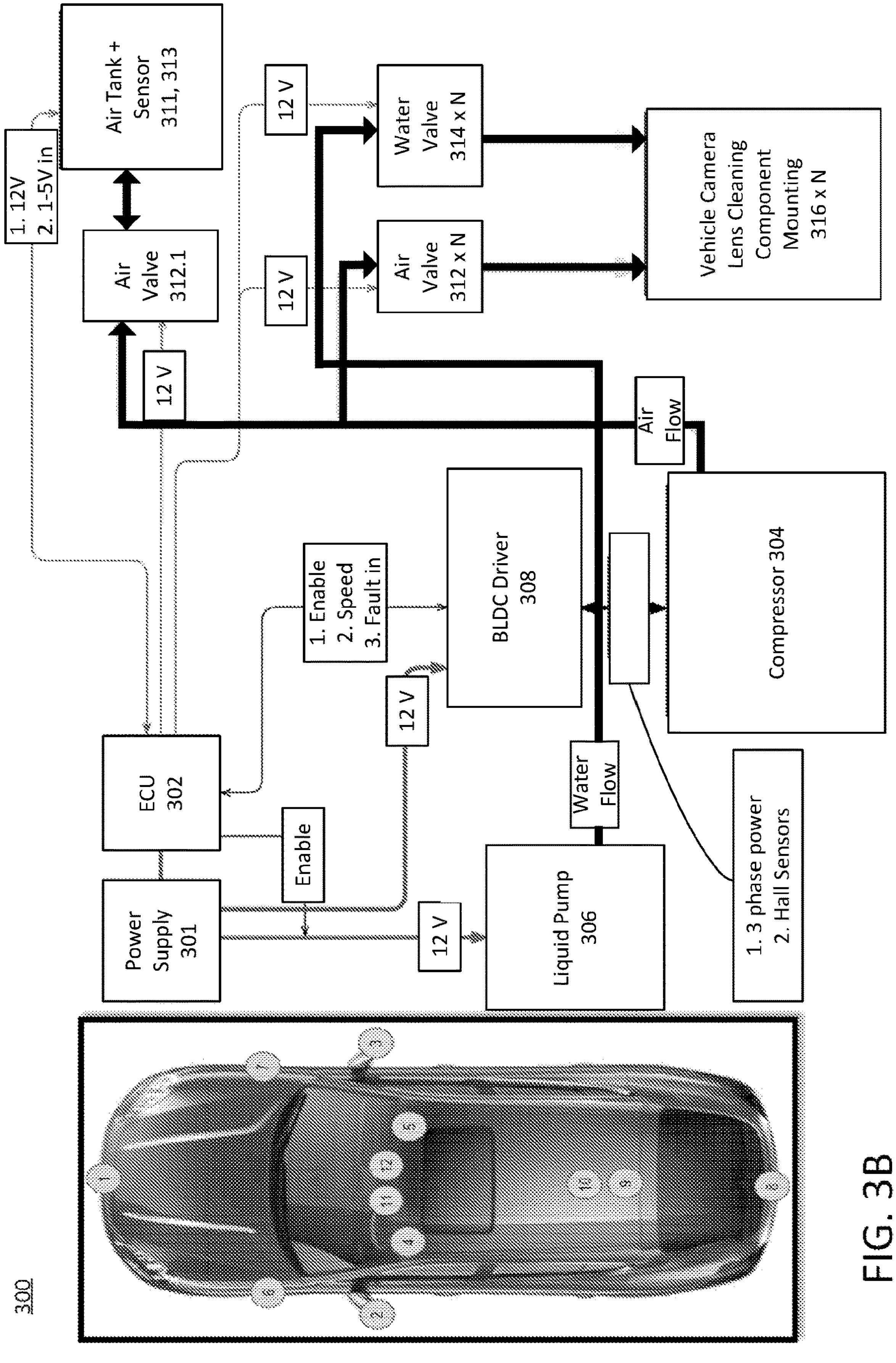
FIG. 3B illustrates another example block diagram of a vehicle camera lens cleaning system showing additional detail, in accordance with one or more aspects of the present disclosure.
Figure 3C:
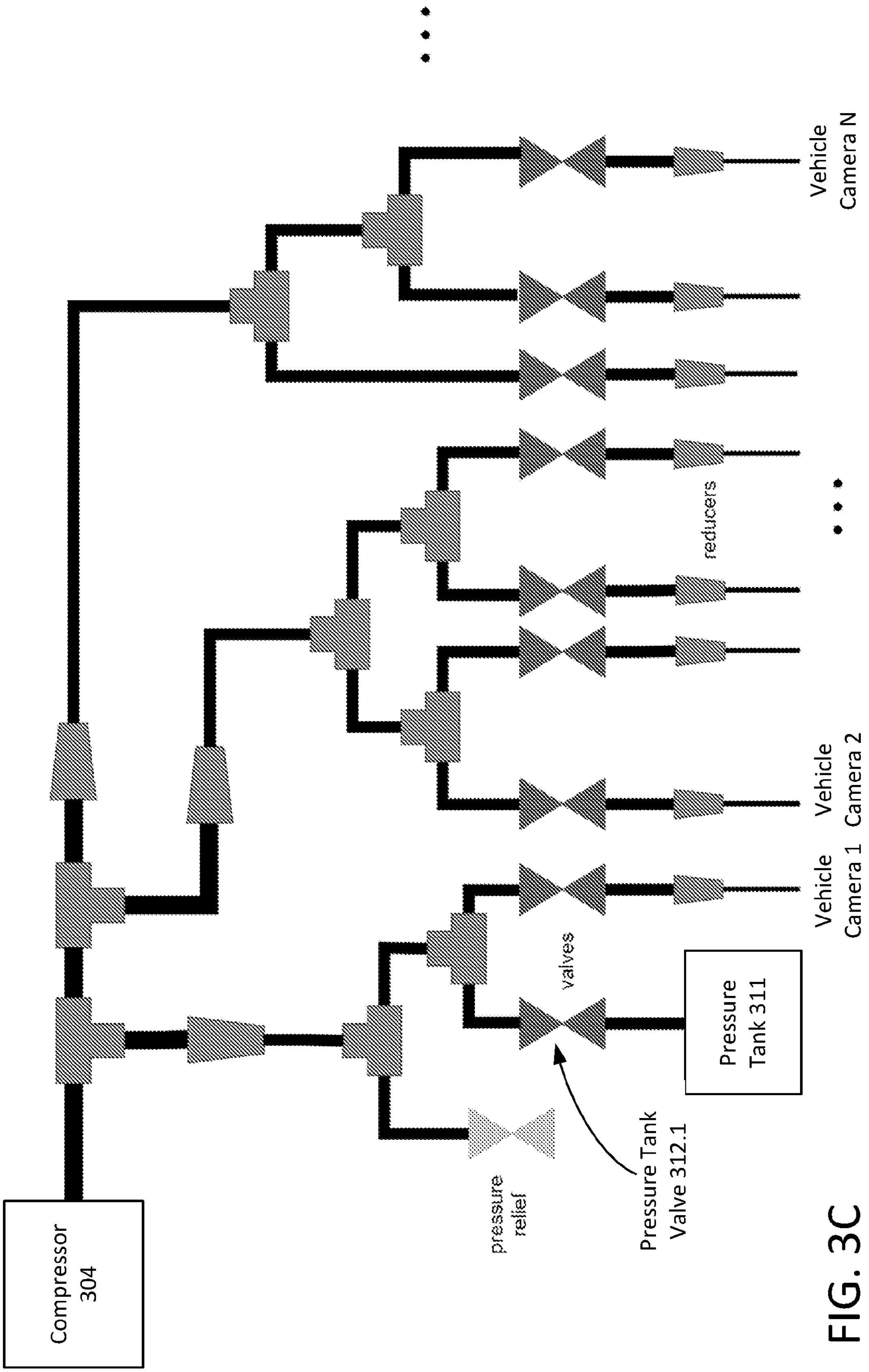
FIG. 3C illustrates an example block diagram of an air tubes configuration, in accordance with one or more aspects of the present disclosure.

An example of an air tubes configuration is shown in further detail in FIG. 3C, in which the air compressor 304 is coupled to a network of air tubes that constitute a portion of the air cleaning subsystem, together with the various controls thereof. It is preferable that the air valves 312.2-312.N be disposed close to the output (e.g. near the reducers) or otherwise proximate to the air output for each vehicle camera lens to be cleaned. It is noted that length and elbows also cause losses, and thus this design parameter needs to be considered. Of course, the configuration of air tubes as shown in FIG. 3C is provided by way of example and not limitation, and any suitable configuration of air tubes may be implemented in accordance with the aspects as described herein The liquid cleaning subsystem includes a liquid pump 306, which is coupled to any suitable number N of actuatable liquid valves 314.1-314.N via any suitable number of liquid tubes, nozzles, etc. The liquid pump 306 may be configured as an on-vehicle liquid pump having any suitable mounting to operate while maintaining low levels of vibrations and noise, providing sufficient liquid flow. Thus, the liquid valves 314.1-314.N may comprise part of a liquid valve network such that each liquid valve 314.1-314.N may be opened or closed via control signals received via the ECU 302, as further discussed herein. In a similar fashion as the air valves 312.1-312.N, the state of each liquid valve 314.1-314.N may thus be controlled in this manner such that the nozzle associated with each vehicle camera lens may output liquid independently from one another in accordance with a respective operating mode.

The air and liquid tubes may form nozzles at their respective outputs, each providing air and liquid, respectively, towards a respectively-coupled vehicle camera lens. To do so, the air and liquid tubes may be any suitable size and shape, and be implemented using any suitable materials to withstand the environment. As one example implementation, the air and liquid tubes may have an initial outer diameter of 12 mm at each respective source, reduce to 6 mm, and end at 3 mm as close as possible to the nozzle to reduce losses. Y fittings are used to split each type of tubing where needed. For example, each air and liquid tube at the output, e.g. at the nozzle, may be comprised of a polyurethane tube having a 2 mm inner diameter and a 3 mm outer diameter. As further discussed below, the air and liquid tubes may be assembled on a fixture mounted to each vehicle camera and directed towards each vehicle camera lens.

The air cleaning subsystem is activated to dry camera lenses after cleaning via a liquid spray and to clear liquid drops from camera lenses, for example, while raining or after a liquid cleaning via the liquid cleaning subsystem. Again, airflow is controlled via actuation of the valves 312.1-312.N, with the valves 312.2-312.N being located near the output (i.e. near the nozzle), as discussed in further detail herein. The liquid cleaning subsystem is activated to wash camera lenses from dust or other debris, which may be used to facilitate a single lens cleaning mode, the details of which are further discussed below.

The flow of liquid is controlled via actuation of the valves 314.1-314.N, which are also located near the output (i.e. near the nozzle), as discussed in further detail herein. The liquid cleaning subsystem may utilize any suitable cleaning fluid such as windscreen washer fluid to perform camera lens cleaning. It is noted that although the same reference 'N' is used for the number of air valves 312 and the liquid valves 314, this is by way of example and not limitation. The air cleaning subsystem and the liquid cleaning subsystem may each include any suitable number of respective air valves 312 and liquid valves 314, which may be the same number as one another (e.g. with each vehicle camera being identified with one air valve 312 and one liquid valve 314), or differ from one another (e.g. with each vehicle camera being identified with one or more air valves 312 and one or more liquid valves 314).

The vehicle camera lens cleaning components as discussed herein may include one or more of the components of the air cleaning subsystem and/or the liquid cleaning subsystem, and may be identified with the vehicle camera lens cleaning components 160 as discussed above with respect to FIGS. 1 and 2. For instance, the vehicle camera lens cleaning components of the vehicle camera lens cleaning system 300 may include the various tubes, valves, reducers, and/or nozzles, etc., with specific portions thereof being coupled to one or more respective vehicle cameras to implement camera lens cleaning as discussed herein. As an illustrative example, a vehicle camera lens cleaning component may include any suitable number of air valves 312.1-312.N, any suitable number of liquid valves 314.1-314.N, and the accompanying air tubing, liquid tubing, reducers, nozzles, and/or the electronic controls as discussed herein to enable a respectively-coupled vehicle camera lens to be cleaned.

To facilitate control of the various vehicle camera lens cleaning components, the vehicle camera lens cleaning system 300 includes an electronic control unit (ECU) 302, which may implement any suitable number and/or type of hardware components, processing circuitry, software components, or combinations thereof. The ECU 302 may implement one or more processors, processing circuitry, controllers, etc., and may optionally constitute components of the vehicle 100 in which the camera lens cleaning system 300 is implemented (e.g. part of the vehicle components 230). The ECU 302 may be implemented as a vehicle electronic control unit (ECU) and/or one or more vehicle components that may work in conjunction with a vehicle ECU. The ECU 302 may be implemented as a dedicated, in-vehicle ECU to facilitate the various functions of the vehicle camera lens cleaning system 300. Alternatively, the ECU 302 may be implemented as part of another ECU of the vehicle 100, and may perform functions in addition to or instead of those associated with the vehicle camera lens cleaning system 300. For instance, the ECU 302 may include and/or be implemented as the one or more processors 102, as discussed above with respect to FIGS. 1 and 2.

In any event, the ECU 302 may be configured to control a state or operating mode of one or more components of the vehicle camera lens cleaning system 300 such as the air valves 312.1-312.N, the liquid valves 314.1-314.N, the air compressor 304, the liquid pump 306, etc. To do so, the ECU 302 is configured to transmit the control signals 305 to the various components of the air cleaning subsystem and the liquid cleaning subsystem to control and regulate the flow of air and liquid, respectively, to the various vehicle camera lens cleaning components as discussed herein. Thus, the ECU 302 may include one or more components configured to control, monitor, and/or communicate with the various components of the camera lens cleaning system 300.

As shown in FIG. 3A, the ECU 302 may include a data interface 302A, processing circuitry 302B, and a control interface 302C. The data interface 302A may be implemented as any suitable number and/or type of components that function to interface with additional devices within the vehicle 100 to receive and/or transmit data, and may implement for instance buses, ports, memory controllers, drivers, buffers, etc. The data interface 302A may form part of any suitable type of communication circuitry implemented by the ECU 302, which may function to enable the ECU 302 to communicate with other computing devices to receive and/or transmit data. For instance, the data interface 302A may facilitate the ECU 302 receiving one or more activation signals 303 indicative of an operating mode of each vehicle camera lens cleaning component that are included as part of the vehicle camera lens cleaning system 300. The activation signals 303 may comprise any suitable type of data that is received by the ECU 302A in accordance with any suitable communication protocol. For example, the activation signals 303 may be transmitted from other vehicle components in accordance with a CAN bus protocol, which are received by the ECU 302 via the data interface 302A. The activation signals 303 may be received by the ECU 302 from any suitable component and in response to any suitable number and/or type of triggering conditions.

The activation signals 303 include data that specify the vehicle camera lenses and the various operating parameters associated with each vehicle camera lens cleaning component of the vehicle camera lens cleaning system 300 to perform a specific type of cleaning of a specific vehicle camera lens. For example, the activation signals 303 may be received from another vehicle ECU that is configured to identify the presence of conditions that are correlated with the need for specific vehicle camera lenses to be cleaned by a corresponding vehicle camera lens cleaning component. The activation signals may also identify (e.g. via a bit string) each vehicle camera to be cleaned, as well as parameters that define how each vehicle camera lens is to be cleaned by placing one or more vehicle camera lens cleaning components into specific operating mode.

For example, the activation signals 303 may include data representing operating parameters for the vehicle camera lens cleaning components such as an identification of specific vehicle cameras and/or the vehicle camera lens cleaning components associated with specific vehicle cameras to be cleaned, durations of time in which air cleaning components and/or liquid cleaning components are to be activated, air compressor speeds, pressure sensor data measured by the pressure sensor 313, etc. As discussed in further detail below, the conditions used to identify that vehicle camera lenses require cleaning, as well as the type of cleaning (i.e. the operating mode) for corresponding vehicle camera lens cleaning components may include detected weather conditions, the use of image processing and/or machine learning algorithms that identify obstructions on the camera lenses that may be cleared using a specific type of cleaning, etc.

Additionally or alternatively, the activation signals 303 may be received from another vehicle component in response to a manual activation by a user. For instance, in a similar fashion as a manual triggering of the application of windshield wiper fluid on a windshield, a user may select a specific vehicle camera lens and/or a specific type of operating mode to place one more vehicle camera lens cleaning components into to perform a camera lens cleaning. In this way, the operation of any components of the air cleaning subsystem and/or the liquid cleaning subsystem may be triggered manually and/or in response to the automatic detection of one or more triggering conditions.

The control interface 302C may be implemented as any suitable number and/or type of components that function to interface with each of the vehicle camera lens cleaning components as discussed herein. Thus, the control interface 302C is communicatively coupled to each of the vehicle camera lens cleaning components, which enables the ECU 302 to receive data from and/or transmit data to each of the vehicle camera lens cleaning components. The control interface 302C may implement for instance buses, ports, memory controllers, drivers, buffers, etc. The control interface 302C may form part of any suitable type of communication circuitry implemented by the ECU 302, which may function to enable the ECU 302 to communicate with other computing devices to receive and/or transmit data.

With continued reference to FIG. 3A, the processing circuitry 302B may be implemented as one or more processors, hardware components, software components, or combinations thereof. The processing circuitry 302B may be implemented, for example, as one or more processors or other components configured to execute machine-readable instructions to execute predetermined functions. The processing circuitry 302B is configured to process the activation signals 303 received via the data interface 320A and to generate, based upon the activation signals, one or more control signals 305. This processing may include correlating each identified vehicle camera identified in the data received via the activation signals 303 to a physical port, bus, wire, etc., implemented via the control interface 302C to the corresponding vehicle camera lens cleaning components associated with the identified vehicle camera. The processing circuitry 302B may also determine the data and/or commands to be transmitted to each vehicle camera lens cleaning component based upon the activation signals 303 such that each vehicle camera lens cleaning component is placed into a particular operating mode at a time specified in accordance with the activation signals 303. Thus, the processing circuitry 302B may generate the control signals 305 from the encoded data associated with the received activation signals 303 such that the generated control signals 305 cause each set of vehicle camera lens cleaning components corresponding to a respective vehicle camera to be placed into a respective operating mode. In this way, the transmitted control signals 305 control the operating mode of each set of vehicle camera lens cleaning components to clean a respectively coupled vehicle camera lens.

Thus, the ECU 302 may control (e.g. via the transmission of the control signals 305) the position or state (i.e. open and closed) of each air valve 312.1-312.N. In this way, the ECU 302 may facilitate sets of vehicle camera lens cleaning components (on a per vehicle camera basis) to utilize either high-pressure air provided by the pressurized air tank 311 or low-pressure air provided directly from the air compressor 304. The ECU 302 may additionally control (e.g. via the transmission of the control signals 305) the position or state (i.e. open and closed) of each liquid valve 314.1-314.N. Thus, the ECU 302 may facilitate sets of vehicle camera lens cleaning components (also on a per vehicle camera basis) to utilize liquid provided by the liquid pump 306 to perform a liquid cleaning.

Each set of vehicle camera lens cleaning components may be identified with each one or more of the cameras utilized by the vehicle. For example, one or more vehicle cameras (or all vehicle cameras) may be associated with one air cleaning component (e.g. an air nozzle, reducer, tubing, and accompanying air valve 312) and one liquid cleaning component (e.g. a liquid nozzle, reducer, tubing, and accompanying liquid valve 314). As another example, one or more of the vehicle cameras may have only liquid or only air cleaning components associated therewith. As yet another example, some of the liquid and/or air cleaning components may be shared among some of the vehicle cameras, whereas in other implementations one or more vehicle cameras may be identified with a different number of liquid cleaning components versus air cleaning components (e.g. two air tubes and one liquid tube, or vice-versa).

The vehicle camera lens cleaning system 300 may also include a pressure sensor 313 that is configured to measure an air pressure identified with the pressure tank 311. The pressure sensor 313 may be incorporated as part of the pressure tank 311 or as a separate component. The ECU 302 may be configured to receive pressure sensor data from the pressure sensor 313 via a pressure signal 307 as shown in FIG. 3A, which is indicative of the current pressure of the air tank 311. The ECU 302 is configured to transmit the control signals 305 to cause the air compressor 304 to re-pressurize the air tank 311 when the pressure sensor data indicates that the pressure of the air tank 311 has dropped below a predetermined threshold pressure value. For instance, the maximum air tank pressure may be 1.5 bar, and when the pressure sensor 313 provides sensor data indicating that the air pressure drops below 0.8 bar (or other suitable air pressure value such as 0.9 bar, 0.7 bar, etc.) the ECU 302 may transmit control signals 305 to the air compressor 304 (and to the air valve 312.1 to open this valve) to activate and fill the air tank 311 until the air tank 311 reaches the maximum pressure or some other predefined air pressure (e.g. 95% of the maximum air pressure, 90% of the maximum air pressure, etc.).

FIG. 3B illustrates another example block diagram of a vehicle camera lens cleaning system showing additional detail, in accordance with one or more aspects of the present disclosure. FIG. 3B illustrates the air flow, liquid flow, and electrical interconnections between the various components of the air cleaning and liquid cleaning subsystems as discussed herein. The system as shown in FIG. 3B thus illustrates an example of how the various vehicle camera lens cleaning components may be coupled together in terms of wiring, tube routing, electrical power, and electronic control within a vehicle having any suitable number of vehicle cameras.

In the example shown in FIG. 3B, the vehicle 100 implements a total of 12 vehicle cameras located as shown in the left portion of the Figure. These vehicle cameras may be any suitable type of camera implemented via the vehicle 100 in accordance with any suitable purpose, and the vehicle 100 may include fewer or additional cameras. In one illustrative scenario, one or more (or all) of the vehicle cameras to which the vehicle camera lens cleaning components are utilized to perform cleaning operations may represent external cameras of an advanced driving assistance system (ADAS) or other suitable system that may be implemented to perform any suitable level of autonomous driving functions. In any event, the aspects as discussed herein may include each one of the vehicle cameras including a nozzle fixture 402 as discussed above and shown in further detail in FIGS. 4A-4E. Again, each of the vehicle cameras may be identified with a set of vehicle camera lens cleaning components that may include one or more air nozzles coupled to air tubing, reducers, one or more respectively coupled air valves 312.1-312.N, etc., as well as one or more liquid nozzles coupled to liquid tubing, reducers, one or more respectively coupled liquid valves 314.1-314.N, etc.

The block diagram as shown in FIG. 3B illustrates the on-vehicle liquid pump 306, air tank 311, air compressor 304, ECU 302, air valves 312.1-312.N, and liquid valves 314.1-314.N as shown in FIG. 3A. Furthermore, the block diagram as shown in FIG. 3B illustrates the power routing to the various components, as well as a brushless DC (BLDC) motor driver 308. Although illustrated as a separate component in FIG. 3B, the BLDC driver 308 may be integrated as part of the air compressor 304, which controls an operative state of the motor identified with the air compressor 304. Thus, the ECU 302 may cause the air compressor 304 to turn on or off via the transmission of control signals 305 to the BLDC driver, which may include an enable signal transmitted to the BLDC driver 308. The ECU 302 may also control a speed of the air compressor 304 motor via transmission of a speed control signal as the control signals 305 to the BLDC driver 308. The ECU 302 may also receive fault signals transmitted from the BLDC driver 308. The block diagram as shown in FIG. 3B also shows an example of the ECU 302 enabling the power provided to the liquid pump 306 via the transmission of the control signals 305, which may be performed when one or more lens cleaning components are to be utilized to perform a liquid cleaning.

Moreover, DC power may be selectively provided to each of the air valves 312.1-312.N and the liquid valves 314.1-314.N via the ECU 302. For example, each of the air and liquid valves 312, 314 may have a respective ground wire connected to the vehicle chassis, and a 12V wire that is connected to the ECU 302. Thus, the ECU 302 may selectively and independently control the delivery of 12V DC power to any of the air valves 312.1-312.N and the liquid valves 314.1-314.N based upon the particular operating mode and trigger conditions as noted herein. Thus, the control signals 305 as discussed above with respect to FIG. 3A may constitute DC voltage levels and/or any suitable data that is transmitted to one or more of the vehicle camera lens cleaning components to cause each receptive vehicle camera lens cleaning component to perform a specific function such as activation of the air compressor 304, actuation of the air valves 312.1-312.N, enabling the liquid pump 306, actuation of the liquid valves 314.1-314.N, etc. The combination of the control signals 305 being transmitted to specific vehicle camera lens cleaning components and the timing of the control signal transmissions results in the vehicle camera lens cleaning components being utilized in accordance with specific operating modes. These operating modes, which may also be referred to herein as cleaning modes, are activated in response to the various triggering conditions as noted above. Additional detail regarding the various operating modes is provided below.

The various power configurations as shown in FIG. 3B are provided by way of example and not limitation, and the DC values as shown may be modified in accordance with different implementations, in various aspects. For instance, the 12V DC power may be increased or decreased to adapt to the needs of the vehicle camera lens cleaning components. Additionally, the DC voltages provided to the sensors or other components (such as the pressure sensor 313) may be modified in accordance with specific applications and the component specifications.

Vehicle Camera Lens Cleaning Component Mounting Configurations

Again, the sets of vehicle camera lens cleaning components may constitute any suitable combination of air and liquid nozzles and tubes mounted to or in proximity of each vehicle camera, as shown in further detail in FIGS. 4A-4E, for instance. The vehicle camera lens cleaning components may additionally include the respectively coupled reducers, tubing, and air and liquid valves 312, 314 associated with each individual vehicle camera in a vehicle that has multiple cameras, as discussed above with reference to FIGS. 3A-3C. Thus, and with respect to the mounting configuration of the air and liquid tubes 404, 406 as shown in FIGS. 4A-4E, the air and liquid tubes 404, 406 and corresponding nozzles may be coupled (i.e. mounted) to each vehicle camera via a nozzle fixture 402, an example of which is shown in further detail in FIG. 4C. In this way, the air and liquid tube nozzles are aligned with each respectively-mounted vehicle camera lens for all camera orientations.

Figure 4A:
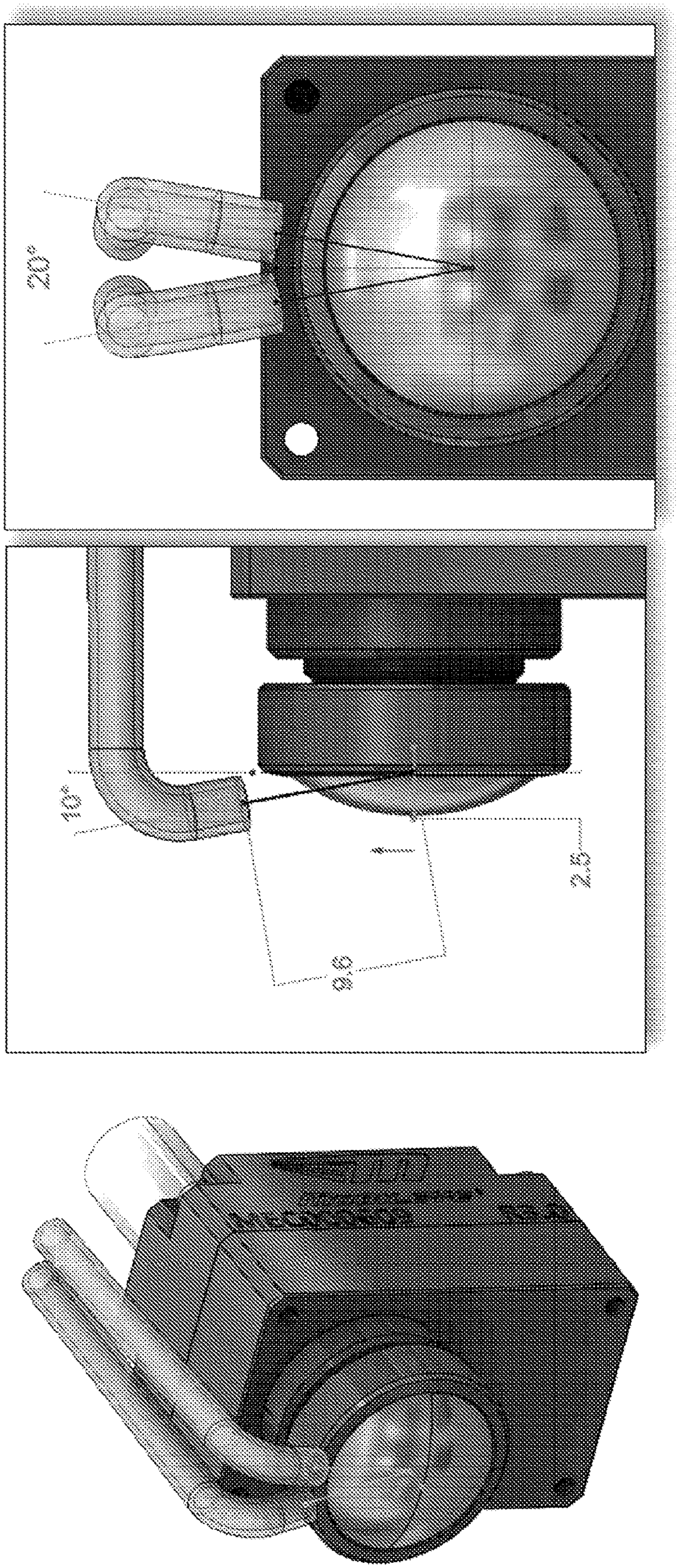
FIG. 4A-4E illustrates example mounting configurations for air and liquid tubes for a vehicle camera lens cleaning system, in accordance with one or more aspects of the present disclosure.
Figure 4B:
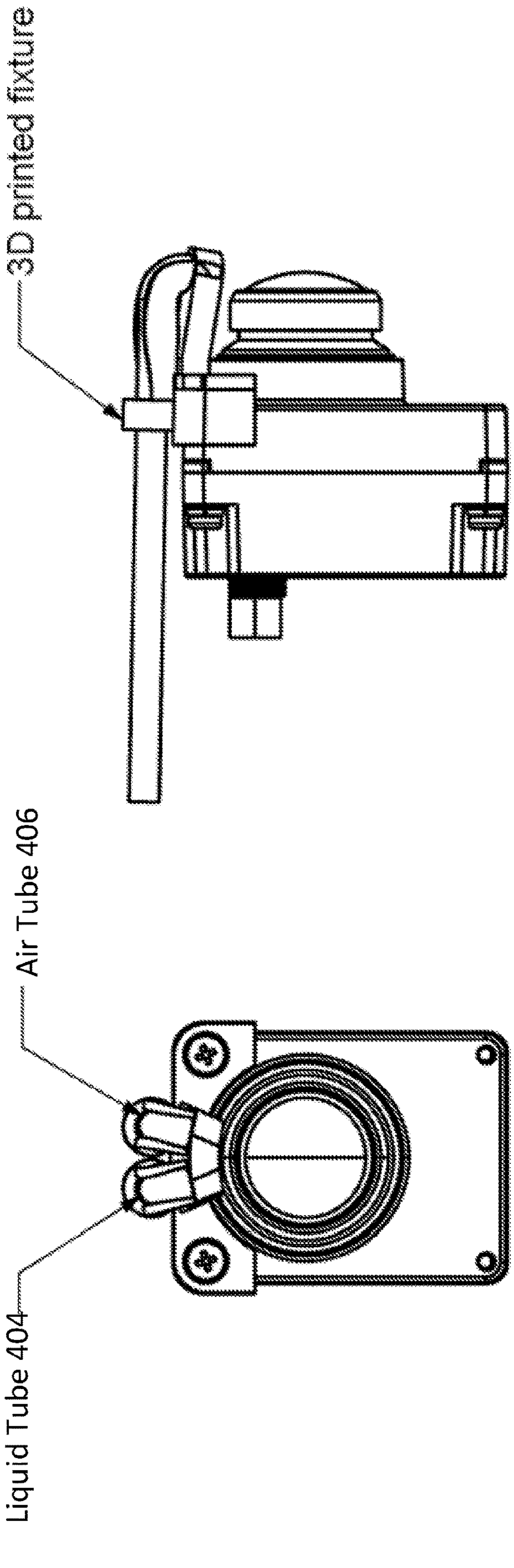
Figure 4C:
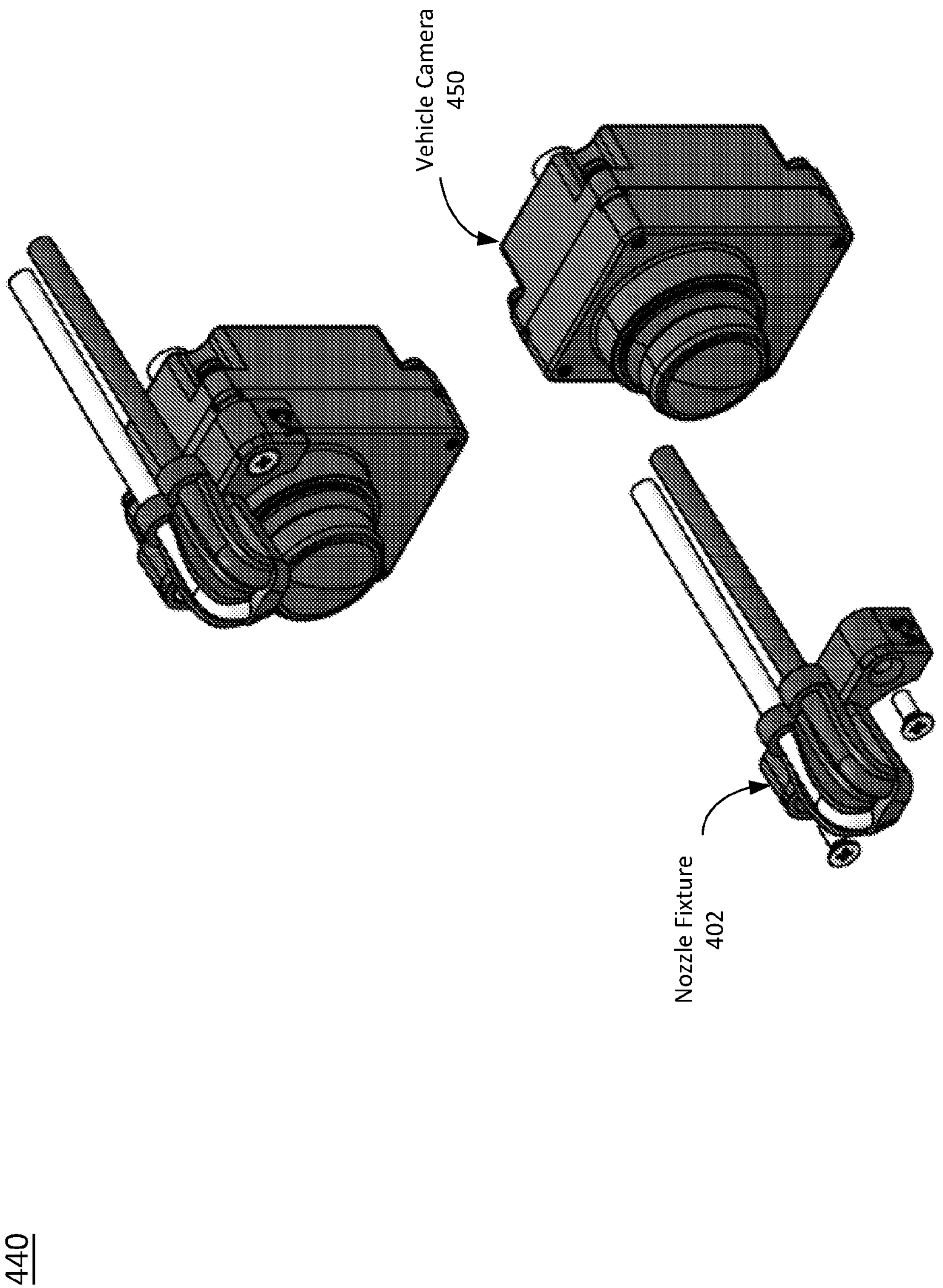
Figure 4D:
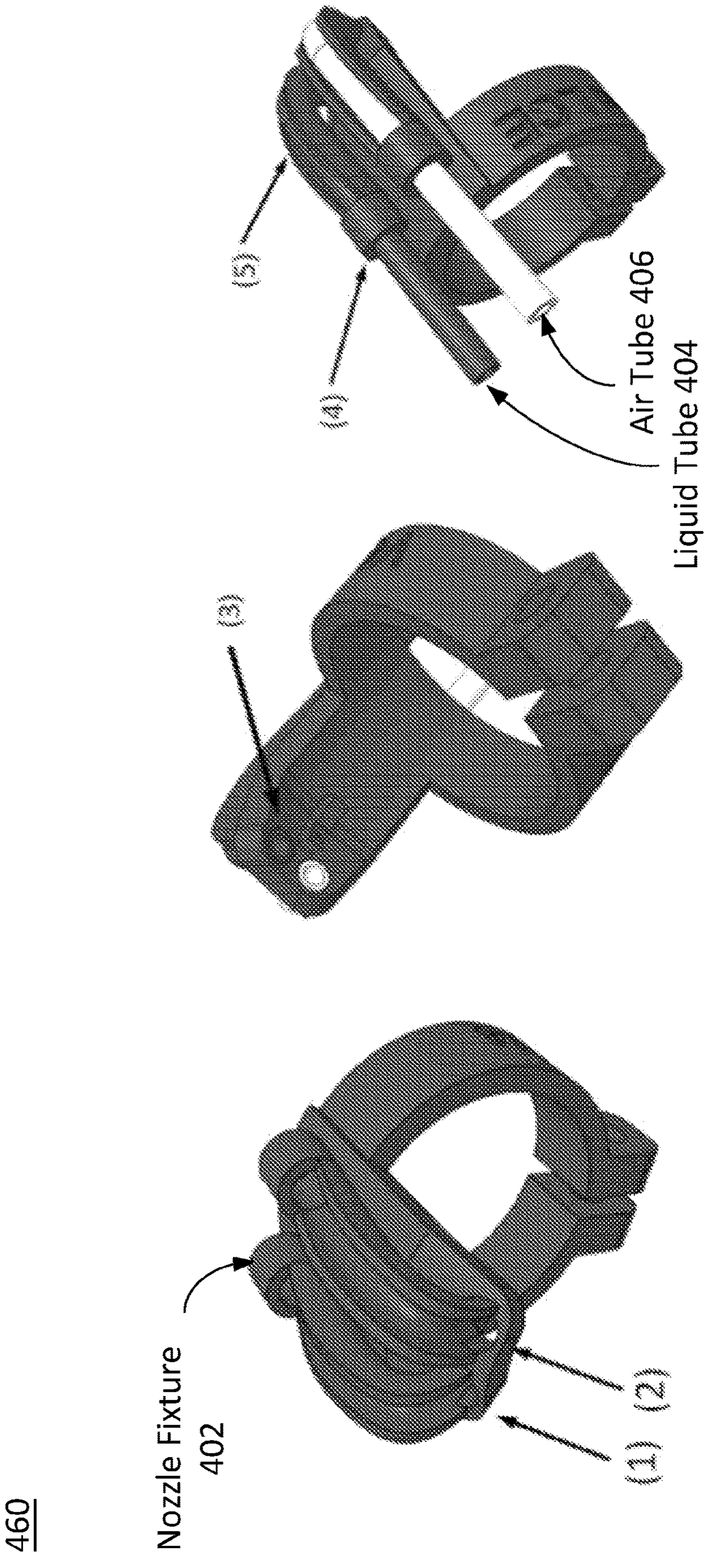
Figure 4E:
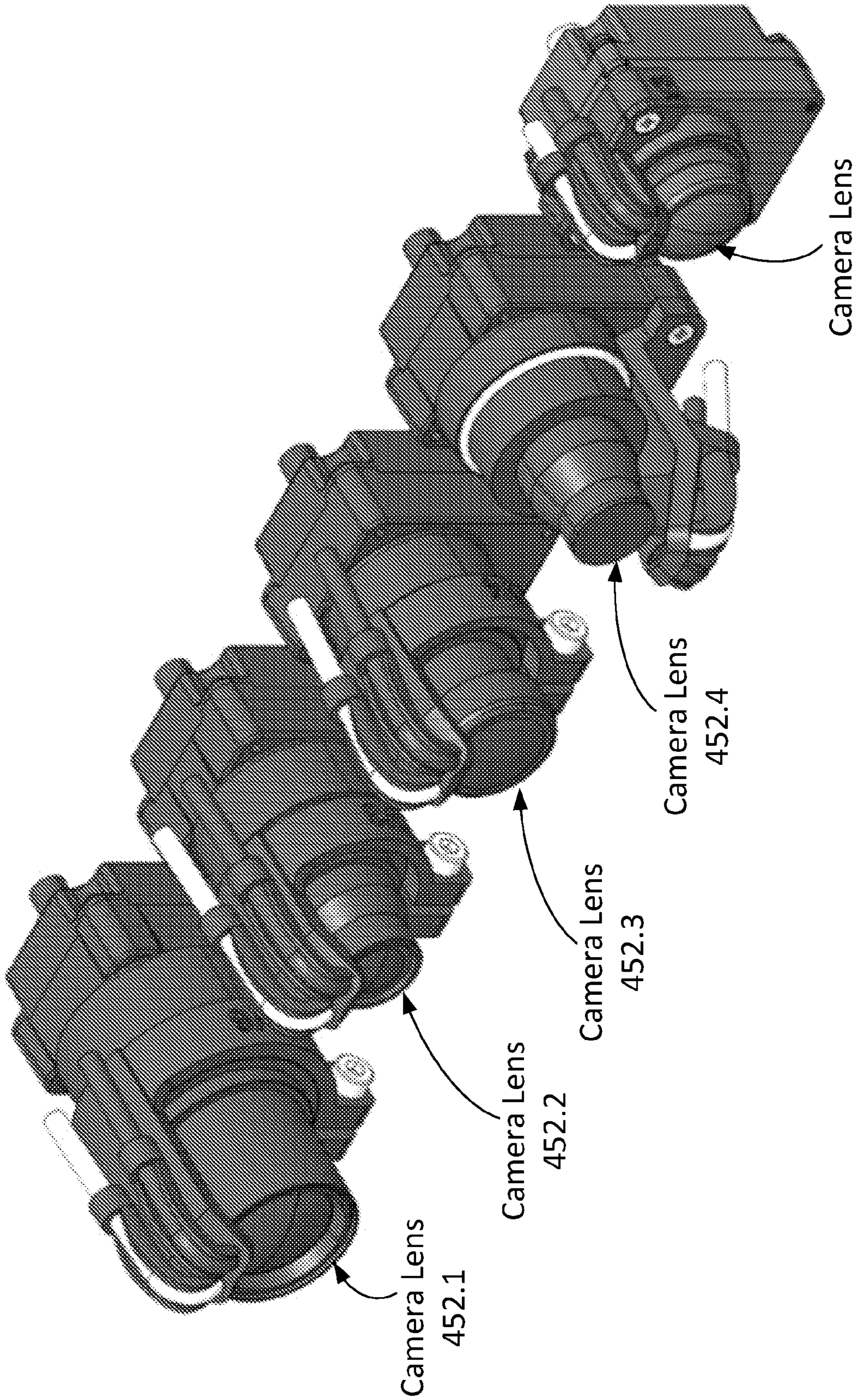

To accomplish this, each vehicle camera may have a separate nozzle fixture 402, which may be implemented on a per-vehicle camera basis and be identified with the vehicle camera lens cleaning component mounting 316 as shown in FIG. 3B. FIGS. 4C, 4D, and 4E illustrate additional details of such nozzle fixtures. Five different nozzle fixtures are shown in FIG. 4E, each facilitating the air and liquid nozzles to be aimed at each of the vehicle camera lenses 452.1-452.5. FIGS. 4C and 4D respectively illustrate further nozzle fixtures and example mounting configurations. The nozzle fixtures thus enable the air and liquid tubes 404, 406 and their corresponding nozzles to be aligned with the vehicle camera lenses of a variety of different vehicle camera sizes and designs, as the nozzle fixtures 402 function as an adapter to mount the air and liquid tubes 404, 406 to any suitable type of vehicle camera. These nozzle fixtures 402 may advantageously be 3D printed (as illustrated in FIG. 4B) to provide customized solutions or, alternatively, manufactured in accordance with any suitable type of manufacturing technique depending upon the particular material used such as injection molding, casting, etc. In this way, each vehicle camera lens includes a nozzle fixture that is optimized for that particular vehicle camera lens with respect to the orientation of the air and liquid tubes, even when the vehicle cameras move or otherwise change orientation.

Operating Modes—Triggering Conditions

Referring now back to FIG. 3A, the ECU 302 may individually control the operating mode of each of the sets of vehicle camera lens cleaning components via the transmission of the control signals 305. The particular cleaning mode may be based upon various conditions that indicate the type of cleaning to be performed, which again may be identified by separate on-vehicle components (such as another ECU) and provided to the ECU 302 via the activation signals 303. Examples of such conditions may include “global” conditions such as the current weather conditions (e.g. rain or snow), which may trigger each of the vehicle camera lens cleaning components to be placed into a continuous cleaning mode of operation. Other examples include “individual” conditions such as a determination that a particular vehicle camera lens requires additional cleaning because an obstruction is present, i.e. the vehicle camera lens is covered in mud, ice, snow, etc., which may cause the activation signals 303 to identify those particular vehicle camera lens cleaning components to be placed into a single lens cleaning mode of operation. Such determinations may be also performed by an occupant in the vehicle and manually triggered, or determined via other vehicle subsystems such as via image processing or other suitable sensing techniques and transmitted to the ECU 302 as information included in the activation signals 303. The activation signals 303 may then trigger the appropriate operating mode of each set of vehicle camera lens cleaning components via the transmission of the control signals 305.

To provide an illustrative example, the activation signals 303 may indicate the operating mode of one or more of the vehicle camera lens cleaning components based upon weather conditions. This may include, for instance, an identification of rain, snow, etc. via another vehicle subsystem, sensors, etc. The weather conditions may be identified, for instance, via any suitable combination of the one or more processors 102, the one or more sensors 105, etc. For instance, the weather conditions may be detected via temperature sensors and/or any other suitable on-vehicle sensors that may identify the presence of environmental conditions. As another example, the weather conditions may be detected via communications received via the remote computing system 150, which may provide location-based weather data via the wireless link(s) 140.

As another illustrative example, the activation signals 303 may indicate the operating mode of one or more of the vehicle camera lens cleaning components in response to image processing performed on images acquired by one or more of the vehicle cameras. This image processing may be performed, for example, via the one or more processors 102 of the vehicle 100. The image processing may include acquiring images from one or more of the vehicle cameras and performing any suitable type of machine vision-based algorithm to determine whether an obstruction is on the lens of the vehicle camera that requires a liquid cleaning to be performed on the vehicle camera from which the images were analyzed. Such obstructions may include, for example, rain, dirt, mud, snow, frost, cracks, smoke, dust, condensation, smeared insects, bird droppings, etc.

As one illustrative example, this may include the use of any suitable type of edge detection algorithm to identify edges for one or more obstruction candidates. Once an obstruction candidate is identified in this manner, the image processing may include repeatedly performing the edge detection or other suitable algorithm to monitor changes to the size, shape, and/or position of the identified obstruction over time. This may include monitoring the obstruction candidate over several frames and/or after successive air cleanings have been performed. If the obstruction candidate does not change or changes in a predetermined or recognized manner, then aspects include the generation of the activation signals 303 to indicate that the liquid cleaning mode should be utilized for that particular vehicle camera lens.

As another illustrative example, the image processing may additionally or alternatively comprise the use of any suitable machine learning techniques to classify a detected obstruction in an acquired image, and then generating and transmitting the activation signals 303 based upon the classified detected obstruction. For example, the one or more processors 102, the one or more memories 202, and/or another memory that is part of the safety system 200 or external to the safety system 200 may be implemented as part of a trained machine learning system such as a deep neural network (DNN) or a convolutional neural network (CNN). The machine learning trained network may be trained on sets of images associated with different types of obstructions, thereby identifying and classifying obstructions from an analysis of the images acquired via the vehicle cameras. As another illustrative example, the one or more processors 102 may implement Support Vector Machine (SVM) techniques, SVM with Radial Basis Function kernel techniques, or any other suitable techniques, including known techniques, to identify obstructions. The use of machine leaning techniques may be particularly useful to differentiate obstructions that require the use of liquid cleaning (such as mud) versus obstructions in which liquid cleaning is not needed or will not provide desirable results (such as a crack).

Additional or alternative techniques for identifying obstructions may also be implemented, such as those described in U.S. Pat. No. 10,632,916, issued Apr. 28, 2020, which is incorporated herein by reference in its entirety.

Operating Modes—Execution

Again, the control signals 305 transmitted via the ECU 302 cause each set of the vehicle camera lens cleaning components to selectively operate in a specific operating mode. Thus, the vehicle camera lens cleaning components associated with each of the vehicle cameras (i.e. the sets of vehicle camera lens cleaning components corresponding to specific vehicle cameras) may be independently operated in the same mode or in different modes depending upon the triggering conditions and the data included in the activation signals 303. In an aspect, the control signals 305 cause each set of the vehicle camera lens cleaning components corresponding to specific vehicle cameras to operate in either a first operating mode that uses low-pressure air provided by the on-vehicle air compressor 304, or in a second operating mode that uses high-pressure air provided by the on-vehicle air tank 311. The first or the second operating mode may additionally include the vehicle camera lens cleaning components utilizing a liquid spray. As the various triggering conditions may change over time and some vehicle cameras may require additional cleaning, the ECU 302 may receive activation signals 303 that result in the transmission of the control signals 305 to dynamically switch the operating modes of each set of the vehicle camera lens cleaning components corresponding to specific vehicle cameras. Thus, the control signals 305 may cause one or more of the sets of vehicle camera lens cleaning components corresponding to specific vehicle cameras to be switched from operation in the first operating mode to operation in the second operating mode, and vice-versa.

The first operating mode may include the operation of any of the vehicle camera lens cleaning components corresponding to specific vehicle cameras using the low-pressure air provided by the on-vehicle air compressor 304. Moreover, the second operating mode may include the operation of any of the vehicle camera lens cleaning components corresponding to specific vehicle cameras using the high-pressure air provided by the on-vehicle air tank 311. Again either the first or the second operating mode may additionally include the vehicle camera lens cleaning components utilizing a liquid spray in addition to the low-pressure or high-pressure air, although it may be particularly advantageous to utilize the liquid spray followed by the high-pressure air provided by the on-vehicle air tank 311, which then acts as an air knife to dry the camera lens. As further discussed below, the ECU 302 may cause each set of the vehicle camera lens cleaning components corresponding to specific vehicle cameras to operate in the first or the second operating mode in accordance with any suitable timing schedule, as further discussed below.

As an illustrative example, the first operating mode may correspond to a continuous cleaning mode of operation. This continuous cleaning mode of operation may be implemented to continuously utilize the lower pressure air provided directly via the on-vehicle air compressor 304, which is sufficient for cleaning vehicle camera lenses under certain conditions such as rain. Thus, the continuous mode of operation, which may alternatively be referred to herein as a rain mode of operation, may comprise one example of the first mode of operation as noted above. FIG. 5A illustrates additional details identified with the continuous mode of operation, which indicates example commands transmitted via the activation signals 303 (commands), the sequence of operation of the vehicle camera lens cleaning components (cleaning ECU sequence), and the parameters provided to the ECU 302 via the activation signals 303 (parameters provided to cleaning ECU).

The use of the vehicle camera lens cleaning components of the air subsystem in this manner advantageously reduces the frequency in which the air pressure tank 311 needs to be re-pressurized by the air compressor 304, and thus results in a lower power consumption and possibly a longer duration of operation. For instance, when driving while raining, the air cleaning subsystem dries the vehicle camera lenses over a cleaning cycle duration in a continuous loop. To do so, the control signals 305 are generated to cause each of the vehicle camera lens cleaning components, each being associated with one or more respective vehicle cameras, to sequentially perform a respective cleaning operation. That is, each of the vehicle camera lens cleaning components is activated to clean one or more respective vehicle cameras during an individual camera cleaning time slot. The individual camera cleaning time slot used to clean each vehicle camera is a fraction of the cleaning cycle duration. As a result, the cleaning cycle duration may be any suitable range of time periods depending upon the number of vehicle cameras to be cleaned and the individual camera cleaning time slot used to clean each vehicle camera lens.

Thus, when driving in the rain as an example, the air cleaning subsystem may operate to cycle through each of the vehicle camera lenses four times per second, for example. In the continuous mode of operation, the air cleaning subsystem may deliver a low pressure air knife to each of the nozzles associated with a vehicle camera lens for any suitable time duration. Therefore, and as shown in FIG. 5A, an example cleaning cycle duration or cleaning “loop” may be 250 milliseconds, during which period of time each of the 12 vehicle cameras is cleaned such that each vehicle camera lens is cleaned four times each second. Therefore, for a system with 12 vehicle cameras, the individual camera cleaning time slot for each vehicle camera lens may be a fraction (one-twelfth in this example) of the cleaning cycle duration, or 250/12≈20 ms. In other words, the cleaning cycle duration is equal to a collective sum of the individual camera cleaning time slots used by each vehicle camera lens cleaning component to clean their respective vehicle cameras. The vehicle camera lens cleaning components for each vehicle camera are thus inactive, or not utilized, for the remainder of time associated with the cleaning cycle duration after the individual camera cleaning time slot has elapsed, i.e. ~230 ms.

During the inactive time period, the vehicle camera lens cleaning components for the other vehicle cameras (i.e. the air valves associated with the other vehicle camera lens cleaning components of the air cleaning subsystem) are alternately utilized. In other words, in the continuous cleaning mode of operation, each vehicle camera lens cleaning component (such as each independently-controlled air valve for each vehicle camera lens) may sequentially clean a respectively-coupled vehicle camera during its own individual camera cleaning time slot within the cleaning cycle duration, while the other vehicle camera lens cleaning components are inactive.

This sequence may run in a continuous manner until the ECU 302 stops the cleaning sequence (or a user manually does so), which may be based upon detected changes in the previous conditions that triggered the activation of the continuous mode, such as the rain or snow stopping. Moreover, because the ECU 302 controls the individual cleaning mode of the vehicle camera lens cleaning components, the activation signals 303 may indicate a modification to the operation of one or more vehicle camera lens cleaning components. For instance, if changes in the current conditions are detected, the activation signals 303 may indicate a modification to the parameters identified with the operating mode of one or more of the vehicle camera lens cleaning components.

To provide an illustrative example, the activation signals 303 may indicate that some vehicle cameras should have a higher prioritization during each cleaning cycle duration over others. For instance, front-facing vehicle cameras may need to be cleaned more frequently than other vehicle cameras. Thus, aspects include the activation signals 303 indicating such a prioritization scheme, and the ECU 302 transmitting the control signals 305 to cause this prioritization scheme to be realized. For example, the control signals 305 may cause one portion (e.g. one set) of vehicle camera lens cleaning components to clean their respectively coupled vehicle cameras with a greater frequency than other portions (e.g. other sets) of vehicle camera lens cleaning components clean their respectively coupled vehicle cameras during the cleaning cycle duration.

As another illustrative example, the higher prioritization of some vehicle cameras over others may include increasing the individual camera cleaning time slot within the cleaning cycle duration for some vehicle cameras compared to others. Again, aspects include the activation signals 303 indicating such a prioritization scheme, and the ECU 302 transmitting the control signals 305 to cause this prioritization scheme to be realized. In the present illustrative example, the control signals 305 may cause a portion (e.g. a set) of vehicle camera lens cleaning components to clean their respectively coupled vehicle cameras with a longer individual camera cleaning time slot duration than another portion (one or more other sets) of vehicle camera lens cleaning components during the cleaning cycle duration. Of course, such an adjustment to the individual camera cleaning time slots may require the cleaning cycle duration to be increased, thereby decreasing the frequency in which all vehicle cameras may be cleaned. Alternatively, such an adjustment to the individual camera cleaning time slots may be achieved by maintaining the cleaning cycle duration while decreasing the individual camera cleaning time slots for other vehicle cameras.

As yet another illustrative example, the higher prioritization of some vehicle cameras over others may include increasing the intensity of cleaning for some vehicle cameras compared to others. Again, aspects include the activation signals 303 indicating such a prioritization scheme, and the ECU 302 transmitting the control signals 305 to cause this prioritization scheme to be realized. In the present illustrative example, the control signals 305 may cause a portion (e.g. a set) of vehicle camera lens cleaning components to clean their respectively coupled vehicle cameras with a greater intensity than another portion (one or more other sets) of vehicle camera lens cleaning components during the cleaning cycle duration. To achieve a higher cleaning intensity in this manner, additional or alternate parameters of the vehicle camera lens cleaning system 300 may be modified with respect to some vehicle cameras over others.

These additional or alternate parameters may include, for example, the air pressure delivered to a vehicle camera lens, a liquid pressure delivered to a vehicle camera lens, a temperature of the liquid delivered to a vehicle camera lens, etc. Although not shown in the Figures, such implementations may be realized via any suitable components configured to control such parameters on a per vehicle camera basis, in a similar manner as the delivery of the liquid to each individual vehicle camera lenses discussed herein. Thus, implementations in which the intensity of cleaning for some vehicle cameras is increased compared to others may include, for example, increasing the air pressure provided by the compressor 304 for certain time periods, switching between the air compressor 304 to the higher pressure air provided by the air tank 311, providing a higher pressure liquid via a separate liquid pump or increasing the pressure output by the liquid pump 306 (not shown), providing a higher temperature liquid spray (not shown) from the liquid pump 306, etc.

Again, the higher prioritization of some vehicle cameras over others may include increasing the cleaning frequency, i.e. how often some of the vehicle cameras are cleaned compared to others. In the present illustrative example, the control signals 305 may cause a portion (one or more sets) of vehicle camera lens cleaning components to clean their respectively coupled vehicle cameras with a greater frequency than another portion (one or more other sets) of vehicle camera lens cleaning components during the cleaning cycle duration. This may be implemented, for example, by toggling between an operating mode that cleans all vehicle cameras within a cleaning cycle versus other operating modes that clean a subset of the vehicle cameras within a cleaning cycle.

It is noted that any subset (or all) of the vehicle cameras may be cleaned in conjunction with any suitable combination of the aforementioned individual camera cleaning time slots, cleaning frequencies, and cleaning cycle duration time periods to realize different respective cleaning profiles, which may alternatively be referred to herein as cleaning cycles. Thus, the first mode of operation may be implemented in accordance with any suitable number of cleaning cycles, and the particular cleaning cycle implemented at any time may be dynamically adapted based upon a change in the triggering conditions and/or manual control, as noted above.

As an example, a cleaning cycle may additionally or alternatively specify certain vehicle cameras and omit others, so that more important cameras are cleaned more frequently. As one illustrative example, a first cleaning cycle may include all vehicle cameras, as noted above, with a cleaning cycle duration or cleaning "loop" of ~240 milliseconds, during which period of time each of the 12 vehicle cameras is cleaned. As another example, a second cleaning cycle may omit cameras 6, 7, 9, and 10, with a cleaning cycle duration of ~160 milliseconds, during which period of time each of the remaining 8 vehicle cameras is cleaned. The ECU 302 may toggle between these cleaning cycles, as well as any other suitable number of cleaning cycles, in accordance with the triggering conditions noted herein.

Again, in contrast to the first mode of operation, for the second mode of operation the vehicle camera lens cleaning components utilize the high-pressure air knife provided by the high-pressure air via the on-vehicle air tank 311. As an illustrative example, the second mode of operation may correspond to a single lens cleaning mode. Thus, the single lens cleaning mode, which may alternatively be referred to herein as a wash mode of operation when a liquid cleaning is also performed, may comprise an example of the second mode of operation as noted above. FIG. 5B illustrates additional details identified with the single lens cleaning mode of operation, which indicates example commands transmitted via the activation signals 303 (commands), the sequence of operation of the vehicle camera lens cleaning components (cleaning ECU sequence), and the parameters provided to the ECU 302 via the activation signals 303 (parameters provided to cleaning ECU).

As an example, in the case of a single vehicle camera lens being dirty, the ECU 302 may receive activation signals 303 that indicate the specific vehicle camera associated with the dirty lens and the need for the set of vehicle camera lens cleaning components associated with that camera lens to be placed in into the single lens cleaning mode. The ECU 302 may then transmit the control signals 305 to place that set of vehicle camera lens cleaning components into the single lens cleaning mode, which may cause the liquid cleaning subsystem to first deliver a liquid spray for any suitable duration (e.g. 200 ms) via actuation of one or more of the liquid valves 314.1-314.N. Then, the air cleaning subsystem may, for the same set of vehicle camera lens cleaning components, deliver the high-pressure air knife via actuation of one or more of the air valves 312.1-312.N for any suitable time duration (e.g. 1000 ms) to immediately dry the vehicle camera lens after the liquid spray. Thus, in contrast to the continuous cleaning mode in which the on-vehicle air compressor 304 supplies the air flow (as the low pressure air is sufficient for those conditions), in the single lens cleaning mode the air supply for the vehicle camera lens cleaning component is supplied from the on-vehicle air tank 311 to provide higher pressure air.

As shown in FIG. 5B, the single lens cleaning mode of operation may be triggered during the operation of the vehicle camera lens cleaning components in the continuous (i.e. rain) mode of operation. In such a case, the ECU 302 may transmit control signals 305 causing the speed of the air compressor to be increased (e.g. via data and/or voltage signals transmitted to the BLDC driver 308) to a predetermined speed setting. The steps 1-5 as shown in FIG. 5B may then be executed for the cleaning ECU sequence, and the continuous mode of operation is temporarily stopped. Next, the high pressure air knife is applied via the delivery of the high pressure air from the on-vehicle air tank 311, and the speed of the air compressor 304 is set back to a lower (e.g. previous), predetermined speed setting via the BLDC driver 308. The continuous mode of operation is then re-activated. Thus, one or more sets of the vehicle camera lens cleaning components may be placed into the single lens cleaning mode of operation while one or more different sets of the vehicle camera lens cleaning components continue (at least temporarily) in the first mode (e.g. the continuous cleaning mode) of operation. In this way, the ECU 302 may transmit the control signals 305 causing one or more of the vehicle camera lens cleaning components to dynamically switch their respective operating modes based upon detected triggering conditions.

Furthermore, the ECU 302 may cause different sets of the vehicle camera lens cleaning components to independently operate in the first and second operating modes, respectively. For example, the ECU 302 may cause one or more sets of vehicle camera lens cleaning components to operate in the continuous cleaning mode of operation while one or more other sets of the vehicle camera lens cleaning components may operate in the single lens cleaning mode. This may be particularly useful for certain types of weather condition such as snow in which the front vehicle camera lenses may become covered in salt in addition to the vehicle cameras being persistently wet due to the snow. It is noted that such a concurrent configuration may be facilitated by timing the activation of each set of vehicle camera lens cleaning components to be active while the others are inactive. Thus, the number of sets of vehicle camera lens cleaning components active simultaneously may be one, two, etc., regardless of the particular cleaning mode being implemented at a particular time. Moreover, the concurrent use the continuous cleaning mode and the single lens cleaning mode may increase the frequency in which the air pressure tank 311 needs to be re-pressurized by the on-vehicle air compressor 304, thus negating some of the advantages described herein via the use of the continuous cleaning mode or operation. Nonetheless, this tradeoff may be acceptable to maintain camera lens cleanliness in certain adverse weather conditions.

To provide additional examples, the ECU 302 may transmit any other suitable types of control signals 305 to cause the various components of the vehicle camera lens cleaning system 300 to operate in any suitable manner. For instance, FIG. 5C illustrates other modes of operation in addition to the first and second modes of operation noted above. These may include, for instance, a canister mode of operation in which the air tank 311 is re-pressurized, an air pressure release mode of operation in which air pressure is released from the air cleaning and the liquid cleaning subsystems, a liquid filling mode of operation in which the liquid tubes of the liquid cleaning subsystem are initially filled, etc.

Figure 6:
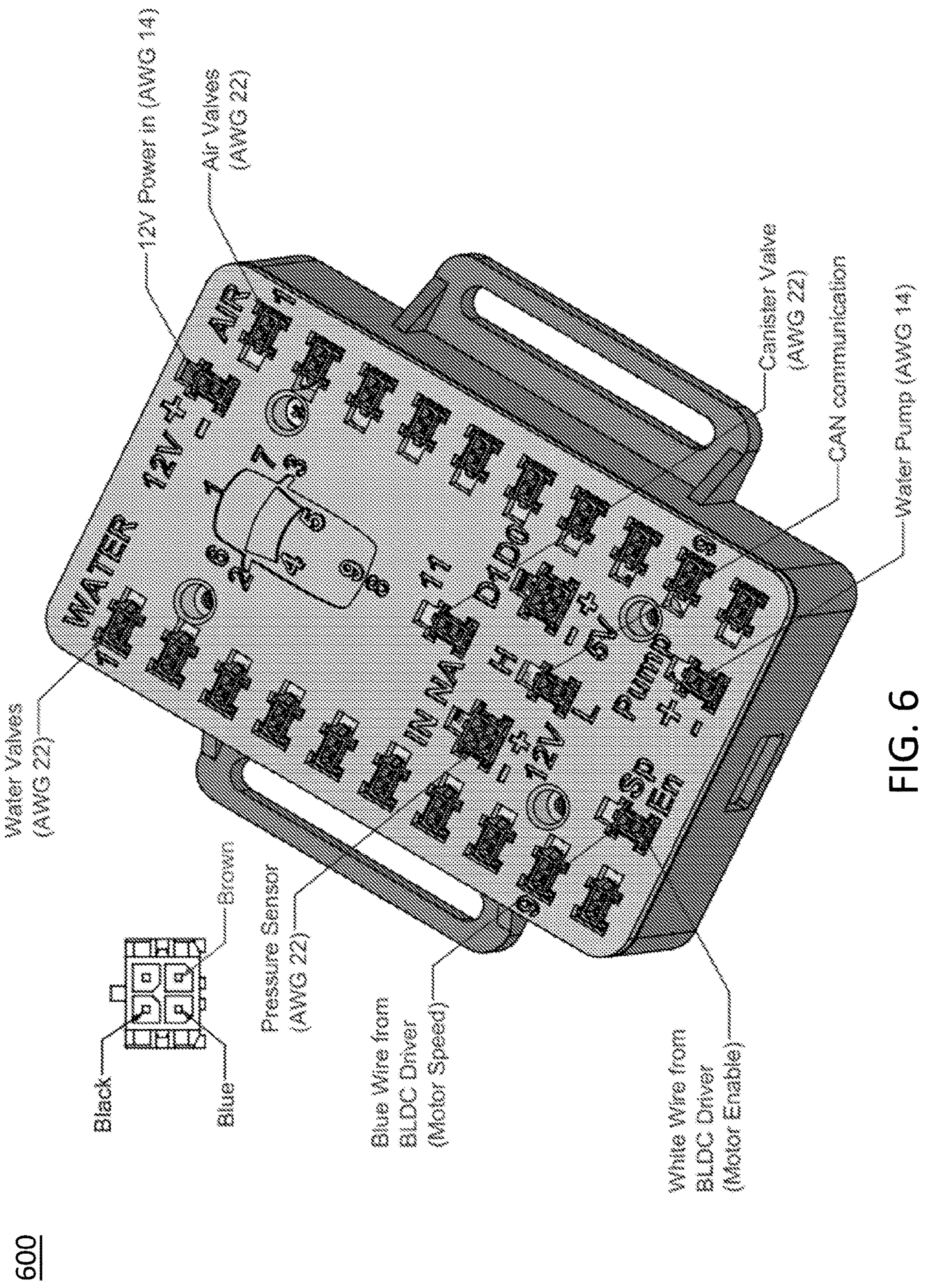
FIG. 6 illustrates an example ECU, in accordance with one or more aspects of the present disclosure.

FIG. 6 illustrates an example ECU, in accordance with one or more aspects of the present disclosure. The ECU 600 as shown in FIG. 6 may be identified with the ECU 302 as shown in FIGS. 3A and 3B, for example. The ECU 600 includes a wiring interface as shown in FIG. 6, which includes a wiring header to support an electrical connection of the ECU 302 to each of the components of the vehicle camera lens cleaning 300 as shown in FIGS. 3A and 3B and to one or more other components of the vehicle 100 to receive the activation signals 303. For example, the CAN communication port may couple the ECU 302 to a CAN bus, thereby enabling communications between the ECU 600 and any suitable number of vehicle components. The CAN bus may facilitate the ECU 600 receiving the activation signals 303, as well as optionally transmitting data via this bus to convey any suitable type of operating information.

The additional wiring ports may facilitate coupling power (e.g. 12V DC and GND) to the ECU 302, as well as the communication of data to and from the various components of the vehicle camera lens cleaning 300, which may include the transmission of the control signals 305. For instance, the control signals 305 may be transmitted to each of the liquid valves 314.1-314.N via the 9 water valve ports on the left side of the ECU 600, as well as to each of the air valves 312.1-312.N via the 9 air valve ports on the right side of the ECU 600. The control signals 305 may also be transmitted to the BLDC driver 308 via the En and Sp ports to control the air compressor 304 activation and speed, respectively. Furthermore, the control signals 305 may be transmitted to the air valve 312.1 via the canister valve port to control access to the pressure tank 311, and to the liquid pump 306 via the water pump port as shown. Still further, the pressure sensor data may be received as part of the pressure signal 307 as shown in FIG. 3A via the pressure sensor ports.

The example ECU 600 as shown in FIG. 6 thus supports a vehicle having up to 9 vehicle cameras. However, the air cleaning subsystem and the liquid cleaning subsystem as discussed herein may be implemented in accordance with any suitable number of vehicle cameras, such as the 12 vehicle cameras as illustrated in FIG. 3B. The, the ECU 600 as shown in FIG. 6 may be adapted to accommodate additional (or fewer) vehicle cameras. Alternatively, more than one wiring interface as shown in FIG. 6 may be implemented to support a number of vehicle cameras greater than 9.

FIG. 7 illustrates an example communication protocol for a vehicle camera lens cleaning system, in accordance with one or more aspects of the present disclosure. The tables shown in FIG. 7 illustrate example codes that may be communicated to the ECU 302 via the activation signals 303 from any suitable vehicle components using a CAN bus protocol, although this is by way of example and not limitation, and any suitable communication protocol may be implemented such as a serial protocol, etc. Moreover, the communication protocol as shown in FIG. 7 also include debugging messages that may be transmitted from the ECU 302 to the vehicle components. Thus, the terms "transmit" and "receive" are with respect to another suitable vehicle component that is transmitting the activation signals to the ECU 302 and optionally receiving debugging signals from the ECU 302.

The activation signals 303 thus identify a message instructing the ECU 302 with respect to which of the vehicle cameras are to be cleaned in accordance with specific modes of operation via their corresponding vehicle camera lens cleaning components. Again, the rain mode as shown in FIG. 7 may be alternatively referred to herein as a continuous mode, whereas the other actions (clean camera #N) correspond to the ECU 302 instructing the sets of vehicle camera lens cleaning components to operate in the single lens cleaning mode as noted above. The ECU 320 receives the activation signals 303 and in turn identifies which components of the vehicle camera lens cleaning system 300 are to be activated via the generation of the appropriate control signals 305, which are then transmitted to those components to realize the operating modes as specified in the activation signals 303. This may be achieved, for instance, via the processing circuitry 302B as noted herein. The ECU 302 may optionally transmit the debugging messages via a CAN bus protocol to any suitable vehicle components, which may represent an "echo" of the received messages and may be used for debugging purposes. Thus, the debugging messages may be transmitted via the same bus used to receive the activation signals 303.

Figure 8:
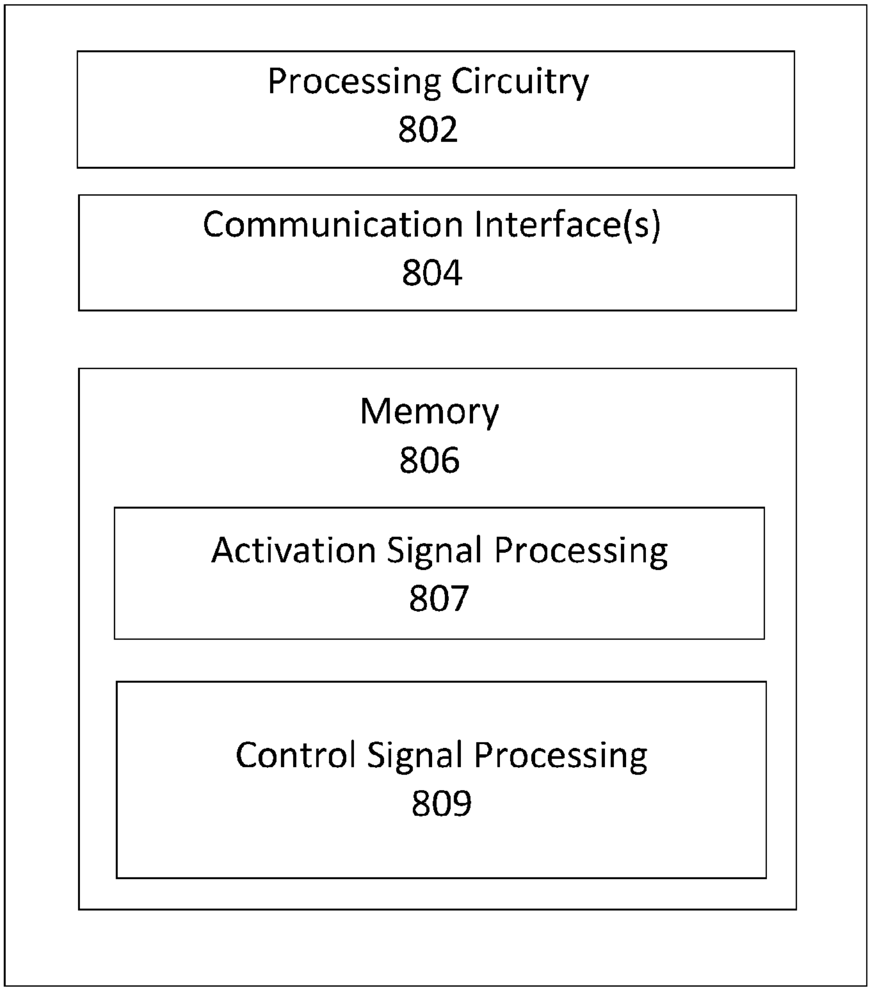
FIG. 8 illustrates an example device, in accordance with one or more aspects of the present disclosure.

FIG. 8 illustrates a block diagram of an exemplary computing device, in accordance with aspects of the disclosure. In an aspect, the computing device 800 as shown and described with respect to FIG. 8 may be identified with a component of the safety system 200 as discussed herein, or a separate computing device that may be implemented within the vehicle 100 or in any separate suitable environment. In an aspect, the computing device 800 may be identified with the ECU 302 as discussed herein. As further discussed below, the computing device 800 may perform the various functionality as described herein with respect to the ECU 302. To do so, the computing device 800 may include processing circuitry 802, one or more communication interfaces 804, and a memory 806. The components shown in FIG. 8 are provided for case of explanation, and the computing device 800 may implement additional, less, or alternative components as those shown in FIG. 8.

The processing circuitry 802 may be configured as any suitable number and/or type of computer processors, which may function to control the computing device 800 and/or other components of the computing device 800. The processing circuitry 802 may be identified with one or more processors (or suitable portions thereof) implemented by the computing device 800, and may include processors identified with the ECU 302 as discussed herein (e.g. the processing circuitry 302B) The processing circuitry 802 may be identified with one or more processors such as a host processor, a digital signal processor, one or more microprocessors, graphics processors, a graphics processing unit (GPU), baseband processors, microcontrollers, an application-specific integrated circuit (ASIC), part (or the entirety of) a field-programmable gate array (FPGA), etc.

In any event, the processing circuitry 802 may be configured to carry out instructions to perform arithmetical, logical, and/or input/output (I/O) operations, and/or to control the operation of one or more components of computing device 800 to perform various functions as described herein. The processing circuitry 802 may include one or more microprocessor cores, memory registers, buffers, clocks, etc., and may generate electronic control signals associated with the components of the computing device 800 to control and/or modify the operation of these components. The processing circuitry 802 may communicate with and/or control functions associated with the communications interface(s) 804 and/or the memory 806.

The communication interface(s) 804 may be implemented as any suitable number and/or type of components that function to interface with additional devices, and may implement for instance buses, ports, data interfaces, memory controllers, etc. The communication interface(s) 804 may form part of an overall communication circuitry implemented by the computing device 800, which may communicate with other computing devices to receive and/or transmit data. For instance, the communication interface(s) 804 may comprise the data interface 302A to facilitate the computing device 800 receiving the activation signals 303 and/or transmitting the debugging messages as discussed above. Additionally or alternatively, the communication interface(s) 804 may comprise the control interface 302C to facilitate the computing device 800 transmitting the control signals 305 to the various components of the vehicle camera lens cleaning system 300 as discussed above.

The memory 806 is configured to store data and/or instructions such that, when the instructions are executed by the processing circuitry 802, cause the computing device 800 (or the vehicle 100 and/or safety system 200 of which the computing device 800 may form a part) to perform various functions as described herein. The memory 806 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 806 may be non-removable, removable, or a combination of both. The memory 806 may be implemented as a non-transitory computer readable medium storing one or more executable instructions such as, for example, logic, algorithms, code, etc.

As further discussed below, the instructions, logic, code, etc., stored in the memory 806 are represented by the various modules as shown in FIG. 8, which may enable the various functions of the aspects as described herein to be functionally realized. Alternatively, if implemented via hardware, the modules shown in FIG. 8 associated with the memory 806 may include instructions and/or code to facilitate control and/or monitor the operation of such hardware components. In other words, the modules as shown in FIG. 8 are provided for ease of explanation regarding the functional association between hardware and software components. Thus, the processing circuitry 802 may execute the instructions stored in these respective modules in conjunction with one or more hardware components to perform the various functions as discussed herein. For example, the processing circuitry 802 may execute the instructions stored in the various modules realize the architecture and functionality of a neural network or other machine learning training system.

The activation signal processing module 807 may execute the functionality as discussed herein with reference to processing the activation signals 303. The executable instructions stored in the activation signal processing module 807 may facilitate, in conjunction with execution via the processing circuitry 802, the computing device 800 to correlate the vehicle cameras identified via the activation signals 303 and accompanying operating modes to mapped physical wired, ports, etc. that are used to subsequently transmit the control signals 305.

The control signal processing module 809 may execute the functionality as discussed herein with reference to the generation and transmission of the control signals 305. The executable instructions stored in the control signal processing module 809 may facilitate, in conjunction with execution via the processing circuitry 802, the computing device 800 generating and transmitting the control signals 305 to the various components of the vehicle camera lens cleaning system 300 to realize the operating modes as specified in the activation signals 303, as discussed herein.

APPENDIX—EXAMPLE OUTPUT SPECIFICATIONS

Air Cleaning Subsystem:

Continuous cleaning: 15 LPM at minimum exiting circular tube of 2 mm diameter. This results in a velocity of ~80 m/s.

$$Q = 15_{LPM} = 0.25_{Liter/s} = 0.00025_{m^3/s}$$

$$A = \pi\frac{d^2}{4} = \pi\frac{(2_{mm})^2}{4} = 3.14_{mm^2} = 0.00000314_{m^2}$$

$$v = \frac{Q}{A} = 79.6_{m/s}$$

Single-lens cleaning: 30 LPM at minimum exiting circular tube of 2 mm diameter. This results in a velocity of ~160 m/s.

It should be noted that the airflow specified above is effective when the camera lens is coated with a hydrophobic coating. A lens without hydrophobic coating will need a larger airflow to dry.

Liquid Cleaning Subsystem

Flow: 2.2 LPM at minimum exiting circular tube of 2 mm diameter. This results in a velocity of ~10 m/s.

Fluid consumption: For one camera, the spray consumes ~7 ml.

EXAMPLES

The following examples pertain to further aspects.

An example (e.g. example 1) relates to an electronic control unit (ECU). The ECU comprises a data interface configured to receive one or more activation signals indicative of an operating mode of a respective one of a plurality of vehicle camera lens cleaning components; a control interface communicatively coupled to the plurality of a vehicle camera lens cleaning components; and processing circuitry configured to generate, based upon the one or more activation signals, one or more control signals that are transmitted via the control interface to control an operating mode of each respective one of the plurality of vehicle camera lens cleaning components, wherein the one or more control signals cause each respective one of the plurality of vehicle camera lens cleaning components to selectively operate in one of (i) a first operating mode that uses low-pressure air provided by an on-vehicle air compressor, or (ii) a second operating mode that uses high-pressure air provided by an on-vehicle air tank.

Another example (e.g. example 2) relates to a previously-described example (e.g. example 1), wherein the one or more control signals cause one of the plurality of vehicle camera lens cleaning components to be switched from operation in the first operating mode to operation in the second operating mode.

Another example (e.g. example 3) relates to a previously-described example (e.g. one or more of examples 1-2), wherein the second operating mode comprises one of the plurality of vehicle camera lens cleaning components utilizing a liquid spray in addition to the high-pressure air provided by the on-vehicle air tank.

Another example (e.g. example 4) relates to a previously-described example (e.g. one or more of examples 1-3), wherein the one or more activation signals indicate the operating mode of each respective one of the plurality of vehicle camera lens cleaning components based upon weather conditions.

Another example (e.g. example 5) relates to a previously-described example (e.g. one or more of examples 1-4), wherein the one or more activation signals indicate the operating mode of each respective one of the plurality of vehicle camera lens cleaning components in response to image processing performed on an image acquired by a vehicle camera.

Another example (e.g. example 6) relates to a previously-described example (e.g. one or more of examples 1-5), wherein the image processing comprises using a machine learning technique to classify a detected obstruction in the acquired image, and wherein the one or more activation signals are transmitted based upon the classified detected obstruction.

Another example (e.g. example 7) relates to a previously-described example (e.g. one or more of examples 1-6), wherein the one or more control signals cause each respective one of the plurality of vehicle camera lens cleaning components to operate in the first operating mode to clean a respectively coupled one of a plurality of vehicle cameras while other ones of the plurality of vehicle camera lens cleaning components are not utilized for cleaning their respective vehicle cameras.

Another example (e.g. example 8) relates to a previously-described example (e.g. one or more of examples 1-7), wherein the processing circuitry is configured to generate the one or more control signals to cause each respective one of the plurality of vehicle camera lens cleaning components to sequentially clean, during a respective individual camera cleaning time slot that is a fraction of a cleaning cycle duration, a respectively coupled one of a plurality of vehicle cameras.

Another example (e.g. example 9) relates to a previously-described example (e.g. one or more of examples 1-8), wherein the cleaning cycle duration is equal to a collective sum of respective cleaning time slots of each respective one of the plurality of vehicle camera lens cleaning components.

Another example (e.g. example 10) relates to a previously-described example (e.g. one or more of examples 1-9), wherein each respective one of the plurality of vehicle camera lens cleaning components is coupled to one or more cameras from among a plurality of external cameras of an advanced driving assistance system (ADAS).

Another example (e.g. example 11) relates to a previously-described example (e.g. one or more of examples 1-10), wherein the one or more control signals comprise a first control signal and a second control signal, the first control signal causing one or more respective camera lens cleaning components to operate in the first operating mode such that at least one of the plurality of vehicle camera lens cleaning components is utilized during the cleaning cycle with a greater frequency than another one of the plurality of vehicle camera lens cleaning components.

Another example (e.g. example 12) relates to a previously-described example (e.g. one or more of examples 1-11), wherein the one or more control signals comprise a first control signal and a second control signal, the first control signal causing one or more respective camera lens cleaning components to operate in the first operating mode such that at least one of the plurality of vehicle camera lens cleaning components is utilized during the cleaning cycle with a respective individual camera cleaning time slot having a greater duration than an individual camera cleaning time slot of another one of the plurality of vehicle camera lens cleaning components.

Another example (e.g. example 13) relates to a previously-described example (e.g. one or more of examples 1-12), wherein the processing circuitry is configured to generate the one or more control signals to cause a one or more first sets of the plurality of vehicle camera lens cleaning components to operate in the first operating mode while one or more second sets of the plurality of vehicle camera lens cleaning components operate in the second operating mode.

An example (e.g. example 14) relates to a non-transitory computer-readable medium. The non-transitory computer-readable medium has instructions stored thereon that, when executed by processing circuitry identified with a vehicle, cause the vehicle to: receive one or more activation signals indicative of an operating mode of a respective one of a plurality of vehicle camera lens cleaning components; transmit, based upon the one or more activation signals, one or more control signals that are transmitted to control an operating mode of each respective one of the plurality of vehicle camera lens cleaning components, wherein the one or more control signals cause each respective one of the plurality of vehicle camera lens cleaning components to selectively operate in one of (i) a first operating mode that uses low-pressure air provided by an on-vehicle air compressor, or (ii) a second operating mode that uses high-pressure air provided by an on-vehicle air tank.

Another example (e.g. example 15) relates to a previously-described example (e.g. example 14), wherein the one or more control signals cause one of the plurality of vehicle camera lens cleaning components to be switched from operation in the first operating mode to operation in the second operating mode.

Another example (e.g. example 16) relates to a previously-described example (e.g. one or more of examples 14-15), wherein the second operating mode comprises one of the plurality of vehicle camera lens cleaning components utilizing a liquid spray in addition to the high-pressure air provided by the on-vehicle air tank.

Another example (e.g. example 17) relates to a previously-described example (e.g. one or more of examples 14-16), wherein the one or more activation signals indicate the operating mode of each respective one of the plurality of vehicle camera lens cleaning components based upon weather conditions.

Another example (e.g. example 18) relates to a previously-described example (e.g. one or more of examples 14-17), wherein the one or more activation signals indicate the operating mode of each respective one of the plurality of vehicle camera lens cleaning components in response to image processing performed on an image acquired by a vehicle camera.

Another example (e.g. example 19) relates to a previously-described example (e.g. one or more of examples 14-18), wherein the image processing comprises using a machine learning technique to classify a detected obstruction in the acquired image, and wherein the one or more activation signals are transmitted based upon the classified detected obstruction.

Another example (e.g. example 20) relates to a previously-described example (e.g. one or more of examples 14-19), wherein the one or more control signals cause each respective one of the plurality of vehicle camera lens cleaning components to operate in the first operating mode to clean a respectively coupled one of a plurality of vehicle cameras while other ones of the plurality of vehicle camera lens cleaning components are not utilized for cleaning their respective vehicle cameras.

Another example (e.g. example 21) relates to a previously-described example (e.g. one or more of examples 14-20), wherein the one or more control signals cause each respective one of the plurality of vehicle camera lens cleaning components to sequentially clean, during a respective individual camera cleaning time slot that is a fraction of a cleaning cycle duration, a respectively coupled one of a plurality of vehicle cameras.

2 Another example (e.g. example 22) relates to a previously-described example (e.g. one or more of examples 14-21), wherein the cleaning cycle duration is equal to a collective sum of respective cleaning time slots of each respective one of the plurality of vehicle camera lens cleaning components.

Another example (e.g. example 23) relates to a previously-described example (e.g. one or more of examples 14-22), wherein each respective one of the plurality of vehicle camera lens cleaning components is coupled to one or more cameras from among a plurality of external cameras of an advanced driving assistance system (ADAS).

Another example (e.g. example 24) relates to a previously-described example (e.g. one or more of examples 14-23), wherein the one or more control signals comprise a first control signal and a second control signal, the first control signal causing one or more respective camera lens cleaning components to operate in the first operating mode such that at least one of the plurality of vehicle camera lens cleaning components is utilized during the cleaning cycle with a greater frequency than another one of the plurality of vehicle camera lens cleaning components.

Another example (e.g. example 25) relates to a previously-described example (e.g. one or more of examples 14-24), wherein the one or more control signals comprise a first control signal and a second control signal, the first control signal causing one or more respective camera lens cleaning components to operate in the first operating mode such that at least one of the plurality of vehicle camera lens cleaning components is utilized during the cleaning cycle with a respective individual camera cleaning time slot having a greater duration than an individual camera cleaning time slot of another one of the plurality of vehicle camera lens cleaning components.

Another example (e.g. example 26) relates to a previously-described example (e.g. one or more of examples 14-25), wherein the one or more control signals cause one or more first sets of the plurality of vehicle camera lens cleaning components to operate in the first operating mode while one or more second sets of the plurality of vehicle camera lens cleaning components operate in the second operating mode.

An example (e.g. example 27) relates to a vehicle. The vehicle comprises a vehicle camera lens cleaning system comprising a plurality of a vehicle camera lens cleaning components; and a controller configured to: receive one or more activation signals indicative of an operating mode of a respective one of the plurality of vehicle camera lens cleaning components; and transmit, based upon the one or more activation signals, one or more control signals; wherein the vehicle camera lens cleaning system is configured, in response to receiving the one or more control signals, to cause each respective one of the plurality of vehicle camera lens cleaning components to selectively operate in one of (i) a first operating mode that uses low-pressure air provided by an on-vehicle air compressor, or (ii) a second operating mode that uses high-pressure air provided by an on-vehicle air tank.

Another example (e.g. example 28) relates to a previously-described example (e.g. example 27), wherein the one or more control signals cause the one of the plurality of vehicle camera lens cleaning components to be switched from operation in the first operating mode to operation in the second operating mode.

Another example (e.g. example 29) relates to a previously-described example (e.g. one or more of examples 27-28), wherein the second operating mode comprises one of the plurality of vehicle camera lens cleaning components to utilize a liquid spray in addition to the high-pressure air provided by the on-vehicle air tank.

Another example (e.g. example 30) relates to a previously-described example (e.g. one or more of examples 27-29), wherein the one or more activation signals indicate the operating mode of each respective one of the plurality of vehicle camera lens cleaning components based upon weather conditions.

Another example (e.g. example 31) relates to a previously-described example (e.g. one or more of examples 27-30), wherein the one or more activation signals indicate the operating mode of each respective one of the plurality of vehicle camera lens cleaning components in response to image processing performed on an image acquired by a vehicle camera.

Another example (e.g. example 32) relates to a previously-described example (e.g. one or more of examples 27-31), wherein the image processing comprises using a machine learning technique to classify a detected obstruction in the acquired image, and wherein the one or more activation signals are transmitted based upon the classified detected obstruction.

Another example (e.g. example 33) relates to a previously-described example (e.g. one or more of examples 27-32), wherein the one or more control signals cause each respective one of the plurality of vehicle camera lens cleaning components to operate in the first operating mode to clean a respectively coupled one of a plurality of vehicle cameras while other ones of the plurality of vehicle camera lens cleaning components are not utilized for cleaning their respective vehicle cameras.

Another example (e.g. example 34) relates to a previously-described example (e.g. one or more of examples 27-33), wherein the controller is configured to generate the one or more control signals to cause each respective one of the plurality of vehicle camera lens cleaning components to sequentially clean, during a respective individual camera cleaning time slot that is a fraction of a cleaning cycle duration, a respectively coupled one of a plurality of vehicle cameras.

Another example (e.g. example 35) relates to a previously-described example (e.g. one or more of examples 27-34), wherein the cleaning cycle duration is equal to a collective sum of respective cleaning time slots of each respective one of the plurality of vehicle camera lens cleaning components.

Another example (e.g. example 36) relates to a previously-described example (e.g. one or more of examples 27-35), wherein each respective one of the plurality of vehicle camera lens cleaning components is coupled to one or more cameras from among a plurality of external cameras of an advanced driving assistance system (ADAS).

Another example (e.g. example 37) relates to a previously-described example (e.g. one or more of examples 27-36), wherein the one or more control signals comprise a first control signal and a second control signal, the first control signal causing one or more respective camera lens cleaning components to operate in the first operating mode such that at least one of the plurality of vehicle camera lens cleaning components is utilized during the cleaning cycle with a greater frequency than another one of the plurality of vehicle camera lens cleaning components.

Another example (e.g. example 38) relates to a previously-described example (e.g. one or more of examples 27-37), wherein the one or more control signals comprise a first control signal and a second control signal, the first control signal causing one or more respective camera lens cleaning components to operate in the first operating mode such that at least one of the plurality of vehicle camera lens cleaning components is utilized during the cleaning cycle with a respective individual camera cleaning time slot having a greater duration than an individual camera cleaning time slot of another one of the plurality of vehicle camera lens cleaning components.

Another example (e.g. example 39) relates to a previously-described example (e.g. one or more of examples 27-38), wherein the one or more control signals cause one or more first sets of the plurality of vehicle camera lens cleaning components to operate in the first operating mode while one or more second sets of the plurality of vehicle camera lens cleaning components operate in the second operating mode.

An apparatus as shown and described.

A method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to “one aspect,” “an aspect.” “an exemplary aspect,” etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. An electronic control unit (ECU), comprising:

a data interface configured to receive one or more activation signals indicative of an operating mode of a respective one of a plurality of vehicle camera lens cleaning components;

a control interface communicatively coupled to the plurality of a vehicle camera lens cleaning components; and processing circuitry configured to generate, based upon the one or more activation signals, one or more control signals that are transmitted via the control interface to control an operating mode of each respective one of the plurality of vehicle camera lens cleaning components, wherein the one or more control signals cause each respective one of the plurality of vehicle camera lens cleaning components to selectively operate between i) a first operating mode that uses low-pressure air provided by an on-vehicle air compressor and (ii) a second operating mode that uses high-pressure air provided by an on-vehicle air tanks.

2. The ECU of claim 1, wherein the one or more activation signals indicate the operating mode of each respective one of the plurality of vehicle camera lens cleaning components based upon weather conditions.

3. The ECU of claim 1, wherein the one or more activation signals indicate the operating mode of each respective one of the plurality of vehicle camera lens cleaning components in response to image processing performed on an image acquired by a vehicle camera.

4. The ECU of claim 3, wherein the image processing comprises using a machine learning technique to classify a detected obstruction in the acquired image, and wherein the one or more activation signals are transmitted based upon the classified detected obstruction.

5. The ECU of claim 1, wherein the one or more control signals cause each respective one of the plurality of vehicle camera lens cleaning components to operate in the first operating mode to clean a respectively coupled one of a plurality of vehicle cameras while other ones of the plurality of vehicle camera lens cleaning components are not utilized for cleaning their respective vehicle cameras.

6. The ECU of claim 1, wherein the processing circuitry is configured to generate the one or more control signals to cause each respective one of the plurality of vehicle camera lens cleaning components to sequentially clean, during a respective individual camera cleaning time slot that is a fraction of a cleaning cycle duration, a respectively coupled one of a plurality of vehicle cameras.

7. The ECU of claim 1, wherein each respective one of the plurality of vehicle camera lens cleaning components is coupled to one or more cameras from among a plurality of external cameras of an advanced driving assistance system (ADAS).

8. The ECU of claim 6, wherein the one or more control signals comprise a first control signal and a second control signal, the first control signal causing one or more respective camera lens cleaning components to operate in the first operating mode such that at least one of the plurality of vehicle camera lens cleaning components is utilized during the cleaning cycle with a greater frequency than another one of the plurality of vehicle camera lens cleaning components.

9. The ECU of claim 6, wherein the one or more control signals comprise a first control signal and a second control signal, the first control signal causing one or more respective camera lens cleaning components to operate in the first operating mode such that at least one of the plurality of vehicle camera lens cleaning components is utilized during the cleaning cycle with a respective individual camera cleaning time slot having a greater duration than an individual camera cleaning time slot of another one of the plurality of vehicle camera lens cleaning components.

10. The ECU of claim 1, wherein the processing circuitry is configured to generate the one or more control signals to cause one or more first sets of the plurality of vehicle camera lens cleaning components to operate in the first operating mode while one or more second sets of the plurality of vehicle camera lens cleaning components operate in the second operating mode.

11. A non-transitory computer-readable medium having instructions stored thereon that, when executed by processing circuitry identified with a vehicle, cause the vehicle to:

receive one or more activation signals indicative of an operating mode of a respective one of a plurality of vehicle camera lens cleaning components; and transmit, based upon the one or more activation signals, one or more control signals that are transmitted to control an operating mode of each respective one of the plurality of vehicle camera lens cleaning components, wherein the one or more control signals cause each respective one of the plurality of vehicle camera lens cleaning components to selectively operate between (i) a first operating mode that uses low-pressure air provided by an on-vehicle air compressor and (ii) a second operating mode that uses high-pressure air provided by an on-vehicle air tanks.

12. The non-transitory computer-readable medium of claim 11, wherein the one or more activation signals indicate the operating mode of each respective one of the plurality of vehicle camera lens cleaning components based upon weather conditions.

13. The non-transitory computer-readable medium of claim 11, wherein the one or more activation signals indicate the operating mode of each respective one of the plurality of vehicle camera lens cleaning components in response to image processing performed on an image acquired by a vehicle camera.

14. The non-transitory computer-readable medium of claim 13, wherein the image processing comprises using a machine learning technique to classify a detected obstruction in the acquired image, and wherein the one or more activation signals are transmitted based upon the classified detected obstruction.

15. The non-transitory computer-readable medium of claim 11, wherein the one or more control signals cause each respective one of the plurality of vehicle camera lens cleaning components to operate in the first operating mode to clean a respectively coupled one of a plurality of vehicle cameras while other ones of the plurality of vehicle camera lens cleaning components are not utilized for cleaning their respective vehicle cameras.

16. The non-transitory computer-readable medium of claim 11, wherein the one or more control signals cause each respective one of the plurality of vehicle camera lens cleaning components to sequentially clean, during a respective individual camera cleaning time slot that is a fraction of a cleaning cycle duration, a respectively coupled one of a plurality of vehicle cameras.

17. The non-transitory computer-readable medium of claim 11, wherein each respective one of the plurality of vehicle camera lens cleaning components is coupled to one or more cameras from among a plurality of external cameras of an advanced driving assistance system (ADAS).

18. The non-transitory computer-readable medium of claim 16, wherein the one or more control signals comprise a first control signal and a second control signal, the first control signal causing one or more respective camera lens cleaning components to operate in the first operating mode such that at least one of the plurality of vehicle camera lens cleaning components is utilized during the cleaning cycle with a greater frequency than another one of the plurality of vehicle camera lens cleaning components.

19. The non-transitory computer-readable medium of claim 16, wherein the one or more control signals comprise a first control signal and a second control signal, the first control signal causing one or more respective camera lens cleaning components to operate in the first operating mode such that at least one of the plurality of vehicle camera lens cleaning components is utilized during the cleaning cycle with a respective individual camera cleaning time slot having a greater duration than an individual camera cleaning time slot of another one of the plurality of vehicle camera lens cleaning components.

20. The non-transitory computer-readable medium of claim 11, wherein the one or more control signals cause one or more first sets of the plurality of vehicle camera lens cleaning components to operate in the first operating mode while one or more second sets of the plurality of vehicle camera lens cleaning components operate in the second operating mode.

21. A vehicle, comprising:

a vehicle camera lens cleaning system comprising a plurality of a vehicle camera lens cleaning components; and a controller configured to:

receive one or more activation signals indicative of an operating mode of a respective one of the plurality of vehicle camera lens cleaning components; and transmit, based upon the one or more activation signals, one or more control signals;

wherein the one or more control signals cause each respective one of the plurality of vehicle camera lens cleaning components to selectively operate between (i) a first operating mode that uses low-pressure air provided by an on-vehicle air compressor and (ii) a second operating mode that uses high-pressure air provided by an on-vehicle air tanks.

22. The vehicle of claim 21, wherein the one or more activation signals indicate the operating mode of each respective one of the plurality of vehicle camera lens cleaning components based upon weather conditions.

23. The vehicle of claim 21, wherein the one or more activation signals indicate the operating mode of each respective one of the plurality of vehicle camera lens cleaning components in response to image processing performed on an image acquired by a vehicle camera.

24. The vehicle of claim 23, wherein the image processing comprises using a machine learning technique to classify a detected obstruction in the acquired image, and wherein the one or more activation signals are transmitted based upon the classified detected obstruction.

25. The vehicle of claim 21, wherein the one or more control signals cause each respective one of the plurality of vehicle camera lens cleaning components to operate in the first operating mode to clean a respectively coupled one of a plurality of vehicle cameras while other ones of the plurality of vehicle camera lens cleaning components are not utilized for cleaning their respective vehicle cameras.

26. The vehicle of claim 21, wherein the controller is configured to generate the one or more control signals to cause each respective one of the plurality of vehicle camera lens cleaning components to sequentially clean, during a respective individual camera cleaning time slot that is a fraction of a cleaning cycle duration, a respectively coupled one of a plurality of vehicle cameras.

27. The vehicle of claim 21, wherein each respective one of the plurality of vehicle camera lens cleaning components is coupled to one or more cameras from among a plurality of external cameras of an advanced driving assistance system (ADAS).

28. The vehicle of claim 26, wherein the one or more control signals comprise a first control signal and a second control signal, the first control signal causing one or more respective camera lens cleaning components to operate in the first operating mode such that at least one of the plurality of vehicle camera lens cleaning components is utilized during the cleaning cycle with a greater frequency than another one of the plurality of vehicle camera lens cleaning components.

29. The vehicle of claim 26, wherein the one or more control signals comprise a first control signal and a second control signal, the first control signal causing one or more respective camera lens cleaning components to operate in the first operating mode such that at least one of the plurality of vehicle camera lens cleaning components is utilized during the cleaning cycle with a respective individual camera cleaning time slot having a greater duration than an individual camera cleaning time slot of another one of the plurality of vehicle camera lens cleaning components.

30. The vehicle of claim 21, wherein the one or more control signals cause one or more first sets of the plurality of vehicle camera lens cleaning components to operate in the first operating mode while one or more second sets of the plurality of vehicle camera lens cleaning components operate in the second operating mode.

31. A method, comprising:

receiving one or more activation signals indicative of an operating mode of a respective one of a plurality of vehicle camera lens cleaning components; and transmitting, based upon the one or more activation signals, one or more control signals to control an operating mode of each respective one of the plurality of vehicle camera lens cleaning components, wherein the one or more control signals cause each respective one of the plurality of vehicle camera lens cleaning components to selectively operate between (i) a first operating mode that uses low-pressure air provided by an on-vehicle air compressor and (ii) a second operating mode that uses high-pressure air provided by an on-vehicle air tanks.

32. The method of claim 31, wherein the one or more activation signals indicate the operating mode of each respective one of the plurality of vehicle camera lens cleaning components based upon weather conditions.

33. The method of claim 31, further comprising:

performing image processing on an image acquired by a vehicle camera, wherein the one or more activation signals indicate the operating mode of each respective one of the plurality of vehicle camera lens cleaning components in response to the image processing.

34. The method of claim 33, wherein the image processing comprises using a machine learning technique to classify a detected obstruction in the acquired image, and wherein the one or more activation signals are transmitted based upon the classified detected obstruction.

35. The method of claim 31, wherein the one or more control signals cause each respective one of the plurality of vehicle camera lens cleaning components to operate in the first operating mode to clean a respectively coupled one of a plurality of vehicle cameras while other ones of the plurality of vehicle camera lens cleaning components are not utilized for cleaning their respective vehicle cameras.

36. The method of claim 31, wherein the one or more control signals cause each respective one of the plurality of vehicle camera lens cleaning components to sequentially clean, during a respective individual camera cleaning time slot that is a fraction of a cleaning cycle duration, a respectively coupled one of a plurality of vehicle cameras.

37. The method of claim 31, wherein each respective one of the plurality of vehicle camera lens cleaning components is coupled to one or more cameras from among a plurality of external cameras of an advanced driving assistance system (ADAS).

38. The method of claim 36, wherein the one or more control signals comprise a first control signal and a second control signal, the first control signal causing one or more respective camera lens cleaning components to operate in the first operating mode such that at least one of the plurality of vehicle camera lens cleaning components is utilized during the cleaning cycle with a greater frequency than another one of the plurality of vehicle camera lens cleaning components.

39. The method of claim 36, wherein the one or more control signals comprise a first control signal and a second control signal, the first control signal causing one or more respective camera lens cleaning components to operate in the first operating mode such that at least one of the plurality of vehicle camera lens cleaning components is utilized during the cleaning cycle with a respective individual camera cleaning time slot having a greater duration than an individual camera cleaning time slot of another one of the plurality of vehicle camera lens cleaning components.

40. The method of claim 31, wherein the one or more control signals cause one or more first sets of the plurality of vehicle camera lens cleaning components to operate in the first operating mode while one or more second sets of the plurality of vehicle camera lens cleaning components operate in the second operating mode.

41. The ECU of claim 1, wherein the selectively-selective operation of each respective one of the plurality of vehicle camera lens cleaning components in the first operating mode that uses low-pressure air provided by the on-vehicle air compressor, and the second operating mode that uses high-pressure air provided by the on-vehicle air tank utilizes a network of air tubes that are independent of a network of liquid tubes used for liquid delivery.

* * * * *